United States Patent
Morishita et al.

[11] Patent Number: 5,879,430
[45] Date of Patent: Mar. 9, 1999

[54] METHOD AND APPARATUS FOR AGING STEEL-MAKING SLAG

[75] Inventors: Shigeru Morishita, Wakayama; Hiroshi Koide, Osaka; Keiichi Komai, Hyogo; Yoshitaka Kinugawa, Hyogo; Yosuke Suezawa, Hyogo; Kazunari Teramae, Hyogo, all of Japan

[73] Assignees: Sumitomo Metal Industries, Ltd.; Kawasaki Jukogyo Kabushiki Kaisha, both of Japan

[21] Appl. No.: 570,334

[22] Filed: Dec. 11, 1995

[30] Foreign Application Priority Data

Dec. 12, 1994 [JP] Japan .................... 6-307713
Oct. 26, 1995 [JP] Japan .................... 7-279263
Oct. 26, 1995 [JP] Japan .................... 7-279269

[51] Int. Cl.[6] ...................................................... C22B 1/00
[52] U.S. Cl. ............................................. 75/751; 204/82
[58] Field of Search ....................... 75/751, 704; 264/82, 264/333

[56] References Cited

U.S. PATENT DOCUMENTS

| 2,260,710 | 10/1941 | Gschwind . | |
|---|---|---|---|
| 3,239,200 | 3/1966 | Brown, Jr. . | |
| 3,895,088 | 7/1975 | Goskel | 264/82 |

FOREIGN PATENT DOCUMENTS

| Sho 61-101441 | 5/1986 | Japan . |
|---|---|---|
| Sho 63-201043 | 8/1988 | Japan . |
| Sho 63-260842 | 10/1988 | Japan . |
| Hei 3-159938 | 7/1991 | Japan . |
| Hei 4-202033 | 7/1992 | Japan . |
| Hei 4-202034 | 7/1992 | Japan . |
| Hei 5-17182 | 1/1993 | Japan . |
| 05085785 | 4/1993 | Japan . |
| Hei 5-238786 | 9/1993 | Japan . |
| Hei 6-92696 | 4/1994 | Japan . |
| Hei 6-92697 | 4/1994 | Japan . |
| Hei 6-127984 | 5/1994 | Japan . |
| 06206743 | 7/1994 | Japan . |
| 06316712 | 11/1994 | Japan . |

*Primary Examiner*—Scott Kastler
*Attorney, Agent, or Firm*—Oppenheimer Wolff & Donnelly LLP

[57] ABSTRACT

A method for aging steel-making slag comprising the steps of charging normal temperature steel-making slag crushed to the extent that the slag having a grain diameter of 25 mm or less which constitutes 80% or more of the total amount into a pressure vessel which can be closed tight enough to seal a pressure substantially higher than atmosphere. The pressure vessel is closed and pressureized steam is supplied into the said vessel for heating the said pressure vessel and slag to raise the temperature and the pressure in the said pressure vessel while discharging condensed hot water. The interior of the vessel is kept under a condition saturated by steam and pressurized up to 2 to 10 $kg/cm^2G$ for 1 to 5 hours. The pressure in the pressure vessel is reduced to be equalized with atmosphere. The steel-making slag is then discharged from the vessel. Apparatus is provided for carrying out the above process and includes a pressure vessel having an opening lid for charging and discharging steel-making slag. A steam generating apparatus connected via a pipe having a valve to upward of the pressure vessel. A pipe having a steam trap connected at the lower position of the pressure vessel so as to discharge hot water. A pipe having a valve connected to the upper portion of the pressure vessel and open to the atmosphere so as to reduce the pressure in the interior of the pressure vessel.

20 Claims, 32 Drawing Sheets

FIG. 24A
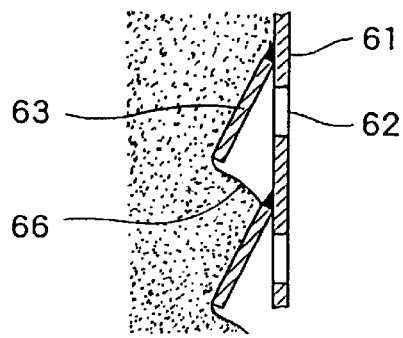
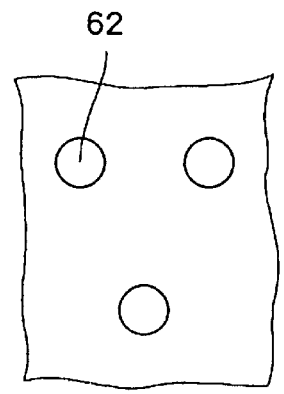
FIG. 24B
FIG. 25A
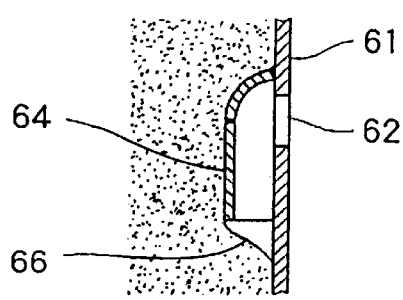
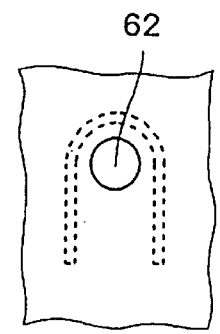
FIG. 25B
FIG. 26A
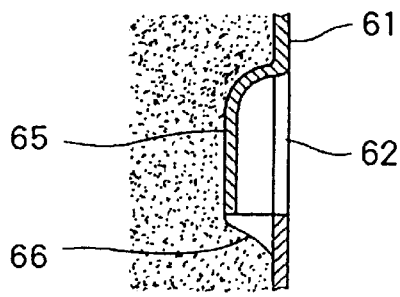
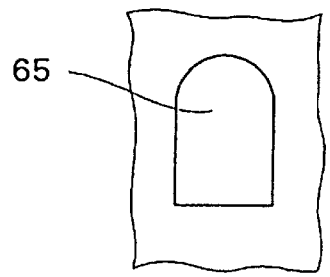
FIG. 26B FIG. 30A
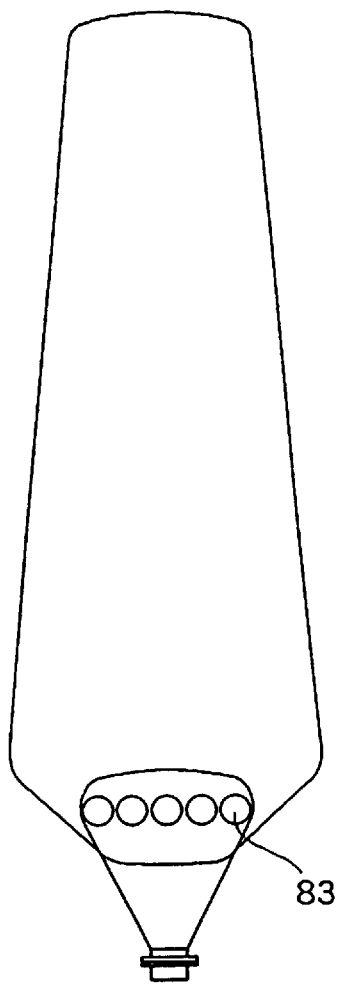
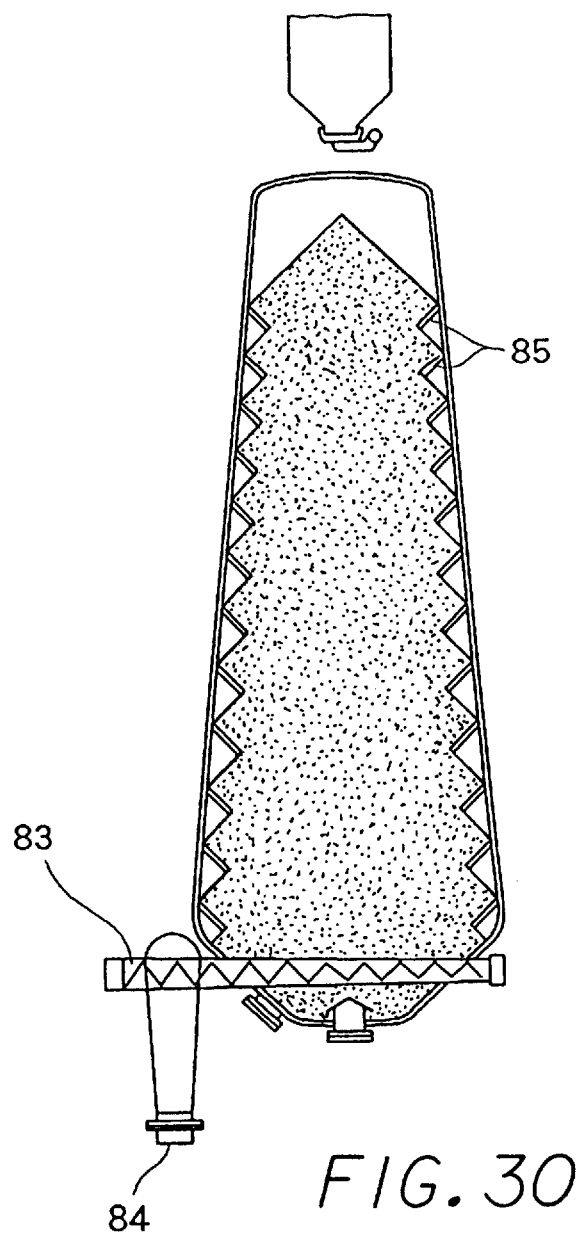
FIG. 30B

| | free lime contain (%) | water-soaked expansion ratio (%) | inner pressure of vessel (kg/cm²G) | amount of slag (t) | temperature holding duration (min) |
|---|---|---|---|---|---|
| experiment1 | 3 | 4 | 4 | 50 | 100 |
| experiment2 | 5.5 | 6 | 4 | 50 | 115 |
| comparison1 | 3 | 4 | 4 | 50 | 120 |
| comparison2 | 5.5 | 6 | 4 | 50 | 150 |

FIG. 42

METHOD AND APPARATUS FOR AGING STEEL-MAKING SLAG

The present invention relates to a method of aging steel-making slag including free lime and discharged from a converter, an electric smelter, etc., (on an industrial scale), by means of artificially swelling the slag in a short time by using steam so as to obtain a product applicable for use as an aggregate for road material and also relates to an apparatus for said method.

The present invention also relates to a method of aging steel-making slag for use as an aggregate for roads, wherein the interior of a pressure vessel is kept in a condition of saturated steam at the predetermined pressure and at the predetermined temperature by supplying pressurized steam into said vessel so as to induce a hydration reaction on the steal slag. Said hydration reaction is monitored by an attenuating ratio of a flow rate of said supplying steam so as to determine the most preferable time for said hydration reaction.

BACKGROUND OF THE INVENTION

A steel-making slag is generated through the process of compounding of unnecessary elements which are produced during melting and smelting of metals. Said slag is cooled and crushed thereafter so as to have a preferable grain diameter. Such slag is popularly used as a superior aggregate for road material because it is a hard crystalline.

During the solution and melting operations as mentioned above, unslaked lime (CaO) is used as a dephosphorizing agent and/or a desulfurizing agent, some of which tends to remain and combine with other molecules (hereinafter referred to as free lime). Said free lime expands when it reacts with water. Therefore, when the steel-making slag including such free lime is used as an aggregate for roadbed, it causes a hydration reaction after a certain amount of time elapses, and it produces adverse effects, such as expansion, collapse and deformation of road surface.

A method of combining natural aging and steam aging of steel-making slag has been disclosed in Japanese Laid-Open Patent Publication No. Hei 4-202034. This method, however, requires a preceding natural aging period of one to three months and a steam aging period of about 10 hours. The total processing time is not shortened.

A method of completing the aging of steel-making slag in about one minute by immersing the slag in water and by applying ultrasonic waves to the slag contained in a small container, such as a glass beaker has been disclosed in Japanese Laid-Open Patent Publication No. Hei 5-17182. However, since the slag layer conveyed on a belt conveyor through water is required to be made thicker when the method is applied on an industrial scale, it is difficult to put the method into practical use.

A processing method of using high-temperature steam of 100° C. or more has been disclosed in Japanese Laid-Open Patent Publication No. Hei 6-92696. However, the partial pressure of steam is low since other gases, such as carbon dioxide, are included. Accordingly, since the condensation temperature of the steam is low, the temperature of slag is not raised sufficiently. It cannot be said therefore that the hydration reaction of steam is speeded up sufficiently. In addition, it is indicated that the aging time can be shortened to about four hours by mixing in the carbon dioxide gas. In this method, however, both sources of steam and carbon dioxide are required to be prepared. Furthermore, carbon dioxide gas dissolves in condensed water and the solution becomes acidic, causing the problem of corroding the apparatus used for the method.

A method of aging slag by using water at a pressure of 1.2 $kg/cm^2G$ or more instead of steam has been disclosed in Japanese Laid-Open Patent Publication No. Hei 6-92697. When water is used as a heating medium, hot water in minute voids between and within the grains of slag is apt to remain when the temperature of the hot water becomes lower than its condensation temperature. Therefore, the hot water in said voids is hardly replaced with higher-temperature hot water, the temperature of which is close to the condensation temperature.

Therefore, the rise in temperature up to the condensation temperature caused by the rise in pressure cannot be fully utilized. As a result, the method requires an aging time of about 12 hours.

A method of charging high-temperature slag having been just discharged from a steel making smelter and having coagulated into a pressure vessel and sprinkling water or the like to perform cooling, aging and crushing simultaneously has been disclosed in Japanese Laid-Open Patent Publication No. Hei 6-127984. In this method, since solids at an extremely high temperature of about 1000° C. must be transferred, the transfer means are required to be heat resistant. Furthermore, since uncrushed large lumps of slag are required to be charged into the pressure vessel, the sealing surfaces of the lids and the walls of the pressure vessel are scratched easily, thereby causing a problem of unsmooth operation.

Therefore, when such slag is used as an aggregate for roads, it is used conventionally after it has been aged so as to be stabilized after completion of expansion and collapse.

Japanese Laid-Open Patent Publication No. Sho 61-101441 discloses that steel-making slag has been conventionally left in natural conditions for three to six months, and proposes a method purportedly capable of significantly reducing the period by blowing high-temperature gas including steam into slag.

However, since slag is processed while it is exposed to the atmosphere, and the high-temperature steam including gas other than steam (air) is blown into the slag in the method, the method still requires a processing time of 48 hours or more.

A method of processing slag in a container such as a hopper has been disclosed in Japanese Laid-Open Patent Publication No. Sho 63-201043. However, since an apparatus, such as a rotary feeder, having relatively low pressure sealing performance is used, the apparatus is not intended for use with high-pressure steam.

Therefore, the slag having been processed in the container of the method is further required to be left out in a natural condition for a certain period. Accordingly, a slag aging period of about two months as required by the conventional method can be reduced only to about a half month.

A method of blowing steam into the slag surrounded at its side and bottom surface by a container has been disclosed in Japanese Laid-Open Patent Publication No. Sho 63-260842. However, since the top of the container is left open or covered with a simple lid, the steam temperature cannot be raised. Therefore, the aging period can be shortened to only about one to three weeks.

A method of performing aging by using saturated steam and warm water while switching two or more slag baths has been disclosed in Japanese Laid-Open Patent Publication No. Hei 3-159938. However, since slag is processed at atmospheric pressure, the temperature of the slag is raised at most up to 80° C. The aging time, therefore, requires about 8 to 24 hours.

A method of performing aging by using high-pressure steam has been disclosed in Japanese Laid-Open Patent Publication No. Hei 4-202033. However, since high-pressure steam is spouted to slag stored at atmospheric pressure, only the enthalpy of the high-pressure steam is utilized, and the temperature of the high-pressure steam is not utilized fully. The aging time therefore cannot be shortened significantly.

Japanese Laid-Open Patent Publication No. Hei 5-238786 applied by one of the applicants of the present invention discloses a method of aging steel-making slag, wherein slag is enclosed in a pressure vessel, steam is supplied into the said vessel to keep the interior of the said pressure vessel under the condition saturated by steam and pressurized higher than atmosphere. According to this disclosure, the aging of steel-making slag is able to be performed only in three hours by maintaining a pressure of about 2 kg/cm$^2$G. However, this publication does not disclose any practical methods to conduct the aging of steel-making slag on a large scale, in particular, regarding how to handle the large amount of hot water generated by the condensation of steam which provides latent heat to slag. Therefore, even those skilled in the art have not been able to carry out industrially the aging of steel-making slag under the condition saturated by steam and pressurized higher than atmosphere, although it has the potentiality to shorten by far the time required to age steel-making slag.

The object of the present invention is to provide a method of the aging steel-making slag under the condition saturated by steam and pressurized higher than atmosphere which can be carried out on a large scale industrially, solving the above mentioned problems encountered in the prior art, in particular, regarding how to handle the large amount of hot water generated by the condensation of steam which provides latent heat to slag. To achieve the above mentioned object, the present invention provides an apparatus and a method for aging steel-making slag comprising the steps of; preparing steel-making slag crushed to have a suitable grain size; supplying the said slag into a suitable vessel; supplying steam into the said vessel while discharging the hot condensation of steam in a suitable manner for a suitable period; relieving steam from the said vessel, and; discharging the said slag from the vessel.

Another object of the present invention is to provide a further improved method and apparatus for the aging of steel-making slag under the condition of saturated steam and of pressure higher than atmosphere by adding a preferable method and means for discharging air from the vessel.

Another object of the present invention is to provide a further improved method and apparatus for the aging of steel-making slag under the condition saturated by steam and pressurized higher than atmosphere by adding a preferable method and means for utilizing the heat of the hot condensation of steam discharged from the vessel, which includes a preferable method and means for using a plurality of vessels for the steel-making slag aging.

Another object of the present invention is to provide a further improved method and apparatus for the aging of steel-making slag under the condition saturated by steam and pressurized higher than atmosphere by adding a preferable method and means for discharging air from the vessels when a plurality of vessels is used for the steel-making slag aging.

Another object of the present invention is to provide a further improved method and apparatus for the aging of steel-making slag under the condition saturated by steam and pressurized higher than atmosphere by adding a preferable method and means for eliminating the tiresome work of cleaning the educed calcium hydroxide adhering around the pipe for discharging the hot condensation of steam.

Another object of the present invention is to provide a further improved method and apparatus of the aging steel-making slag under the condition saturated by steam and pressurized higher than atmosphere by adding a preferable method and means for eliminating the dust problem of the steel-making slag discharged from the vessel after the aging.

SUMMARY OF THE INVENTION

The present invention provides a method for aging steel-making slag comprising the steps of;

(1) charging normal temperature steel-making slag crushed to the extent that the slag having a grain diameter of 25 mm or less which constitutes 80% or more of the total amount into a pressure vessel which can be closed tight enough to seal a pressure substantially higher than atmosphere, (2) closing the said pressure vessel, supplying pressurized steam into the said vessel for heating the said pressure vessel and slag to raise the temperature and the pressure in the said pressure vessel while discharging condensed hot water, (3) keeping the interior of the said vessel under a condition saturated by steam and pressurized up to 2 to 10 kg/cm$^2$G for 1 to 5 hours, (4) reducing the pressure in the said pressure vessel to be equalized with atmosphere, and (5) discharging the said steel-making slag from the pressure vessel.

According to the above mentioned method, the free lime in the slag is able to be hydrated enough to make the slag swollen artificially to have a quality sufficient for use as the aggregate for road.

The said normal temperature of the slag to be supplied to the vessel can be slightly higher than normal temperature such as that of the slag preheated up to some extent, but it should be such a level as to allow the slag to be handled by a belt conveyer or the like, that is, at most 200° C. or less. High temperature slag such as that just discharged from a smelter, having a temperature as high as 1000° C., is not desirable for industrial scale use from an economical point of view, and hence is not applicable to the present invention.

It is desirable that the material slag should be crushed to a grain size of up to 25 mm in diameter depending on the standards of desired aggregate for road materials. Since the grains collapse during aging, the size of the grain may be made slightly larger. However, it is desirable that crushing should be performed to the extent that slag having a grain diameter of 25 mm or less constitutes 80% or more of the total amount. If the grain diameter of the slag is too large, as the unslaked lime at the grain surface layer becomes slaked lime, the hydration reaction of the unslaked lime in the grains hardly proceeds, and the aging time may be extended.

Since the saturation temperature of steam is determined by the pressure of the steam and the speed of the hydration reaction increases at higher temperature, the pressure of the steam should be higher. Accordingly, it is desirable that the pressure of the steam should be 2 kg/cm$^2$G or more.

Furthermore, as the pressure is raised, the rising rate of the saturation temperature corresponding to the rising rate of the pressure decreases, and a more expensive pressure vessel is necessary in order to bear the high pressure. Therefore, it is desirable that the pressure of the steam should be 10 kg/cm²G or less.

When the pressure in the vessel is kept at the predetermined level of 2 to 10 kg/cm²G, the steam condenses on the surface of slag grain at the saturated temperature of steam which corresponds to the pressure, but the temperature of the hot water condensed from the steam becomes gradually lower than the saturated temperature giving its sensible heat to slag. Therefore, it is essential for the present invention to continue discharging hot condensation in order to avoid the temperature of the grain surface becoming lower than the saturated temperature corresponding to the pressure level at every instance. For the present invention, continuous discharging of hot water is inevitable during the above mentioned step (2). It is also preferable but can be omitted during the above mentioned step (3), because the amount of hot water at this step is relatively small.

Moreover, the continuous discharging of hot water is inevitable to avoid the adhesion of calcium hydroxide in the vessel. Said hot condensation of steam contains a fair amount of calcium hydroxide as a solute, which is generated by hydration reaction of free lime. On the one hand the solubility in water of calcium hydroxide decreases as the temperature of water increases, but on the other hand if the hot condensation is not discharged from the vessel, the water temperature will increase as the pressure of the vessel increases, because the hotter condensation will be generated and mixed. Therefore, insoluble calcium hydroxide will be educed and adhere in the vessel.

Further, the present invention is related to an aging method wherein air-mixed steam stored in the pressured vessel is released out of the pressured vessel during a heating and pressurizing process and a temperature holding process of saturated steam condition.

In the present invention, releasing operation of said air-mixed steam is controlled according to time, temperature, or pressure as follows. Namely, as for time controlling, the preferable releasing time of the air-mixed steam is from 5 to 60 minutes, and in particular, from 10 to 30 minutes release time is the most preferable.

As for pressure control, the preferable starting point of releasing air-mixed steam from the pressured vessel is the time when the interior pressure becomes 1 kg/cm²G. Preferably, the releasing is continued until the pressure within the pressured vessel becomes more than 50% and less than 95% of the desirable predetermined pressure of the pressured steam to be supplied into the pressured vessel.

In addition, as for a temperature control, the preferable starting point of releasing said air-mixed steam is at the time when the difference between a temperature of the air-mixed steam (saturation temperature at a partial pressure of steam) and a saturate temperature of steam at the pressure (saturation pressure of steam at total pressure) in the pressured vessel becomes more than 5° C. Preferably, the releasing of said air-mixed steam is continued until the difference between a temperature of the air-mixed steam and a saturate temperature of steam at the pressure in the pressured vessel becomes less than 5° C.

The present invention is also related to an aging method wherein a pipe is connected to an air storing tank which temporary stores said air-mixed steam through said pipe while said air-mixed steam is released out of the pressured vessel.

The present invention also provides an apparatus for a steel-making slag aging comprising a plurality of pressure vessel are connected so as to communicate with each other. The plurality of pressure vessel are used selectively for aging. Further, during pressure reducing steps, a part of steam discharged from the first aging pressure vessel is supplied to another pressure vessel for the next aging. In this way, a part of the pressurized steam to be supplied to the accompanying steps by the next pressure vessel is prepared by the first pressure vessel.

The present invention also provides apparatus for steel-making slag aging comprising;

a pressure vessel having an opening lid for charging and discharging steel-making slag, a steam generating apparatus connected via a pipe having a valve to upward of the pressure vessel, a pipe having a steam trap connected at the lower position of the pressure vessel so as to discharge hot water, a pipe having a valve connected to the upper portion of the pressure vessel and open to the atmosphere so as to reduce the pressure in the interior of the pressure vessel.

The present invention provides an apparatus for aging steel-making slag having a pipe near the bottom of a pressure vessel so that air-mixed steam is released from the pressure vessel.

Further, said apparatus has the transmitting means for charging slag into a pressure vessel and discharging slag from said pressure vessel. The transmitting means comprises a transmitting truck which is equipped with an unsealed container to store steel-making slag therein.

Further, both the opening angle and the center of gravity of said unsealed container are predetermined so as to discharge smoothly supplied slag out of the pressure vessel by opening a lid of the unsealed container.

The apparatus of the present invention further comprises a platform which contemporary supports an unsealed container; a discharging member for discharging aged slag stored in the unsealed container; and, a sprinkler which sprinkles water on the aged slag. The sprinkler is mounted on both the above described platform and the above described discharging member respectively.

Further, in the aging method of the present invention, the attenuating condition of the steam flow rate Q particularly seen in said temperature holding process is concerned so as to save necessary operation time for the above steps. Namely, the change of the steam flow rate Q in comparison with time t before completion of the hydration reaction is studied so as to determine the point when steam flow rate Q becomes zero or the point when there appears no change in steam flow rate by the calculation. Thereby, the required period for the temperature holding process may be determined.

In summing up, the present invention provides a method for steel-making slag aging wherein slag of normal temperature which is crushed to have the predetermined grain diameter charged into a sealable pressure vessel, wherein the interior of the pressure vessel is retained at the predetermined high temperature and pressurized steam atmosphere by means of supplying said pressure vessel with high temperature and pressurized saturated steam, thereby, a hydration reaction of steel-making slag in said steam atmosphere is induced. According to the progress of said hydration reaction, attenuating change curve of pressured high temperature saturated steam flow rate is calculated so as to anticipate the ending time of the hydration reaction and thereby the most preferable period for the hydration reaction is determined.

BRIEF DESCRIPTION OF THE DRAWINGS

The features of this invention which are believed to be novel are set forth with particularity in the appended claims.

The invention may be best understood by reference to the following description taken in conjunction with the accompanying drawings, in which like reference numerals identify like elements in the several figures and in which:

FIG. 24(a) is a sectional view of an unsealed container equipped with shelves for covering holes provided on the side surface of the container, FIG. 24(b) is a front view of the container;

FIG. 25(a) is a sectional view of an unsealed container equipped with cover plates for covering holes provided on the side surface of the container, FIG. 25(b) is a front view of the container;

FIG. 26(a) is a sectional view of an sealed container, parts of the side surface of which are bent so as to cover holes provided on the side surface of the container, FIG. 26(b) is a front view of the container;

FIG. 30(a) is a front view illustrating still another embodiment of a pressure vessel, FIG. 30(b) is a side sectional view of the pressure vessel;

FIG. 42 is a table illustrating the improved results of experiments conducted in accordance with the present invention.

DETAILED DESCRIPTION OF THE PREFERRED EMBODIMENT

Figure 1:
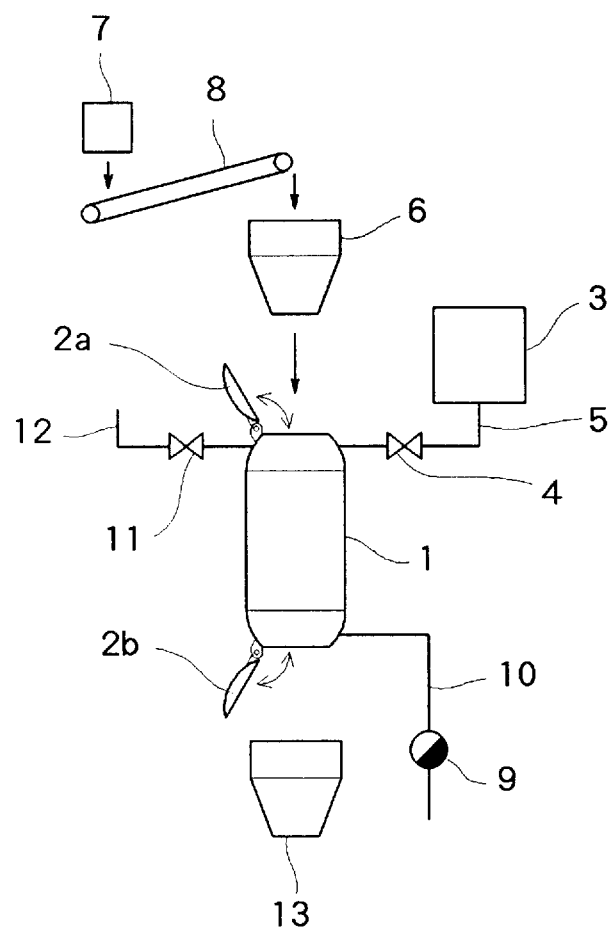
FIG. 1 is an overall structural view illustrating an embodiment of a steel-making slag aging apparatus of the present invention.

FIG. 1 shows an overall structural view of the first embodiment of the present invention, i.e. the embodiment 1.

In the apparatus, a crusher 7 for crushing steel-making slag and a conveyor 8 for transferring the crushed slag to a charging chute 6 are arranged. A pressure vessel 1 is disposed below at the discharging opening of said charging chute 6 to charge the slag transferred via the conveyor 8 and the charging chute 6. Said pressure vessel 1 has closable lids of a top lid 2a and a bottom lid 2b so as to keep steam in the interior of said vessel at a predetermined pressure/ temperature. The upper portion of the pressure vessel 1 is connected, via a pipe 5 having a valve 4, to a steam generator 3 for supplying steam into the pressure vessel 1. To the lower portion of the pressure vessel 1, a pipe 10 equipped with a steam trap 9 is connected so that hot water is discharged therefrom. A pipe 12 having a valve 11 is connected to the upper portion of said pressure vessel 1, to reduce the internal pressure of the pressure vessel after aging. Further, a slag container 13 is disposed below the lower portion of the pressure vessel 1 so as to discharge aged slag out of the pressure vessel after aging is completed. By opening the bottom lid 2b the steel-making slag is supplied into the slag container 13.

Figure 2:
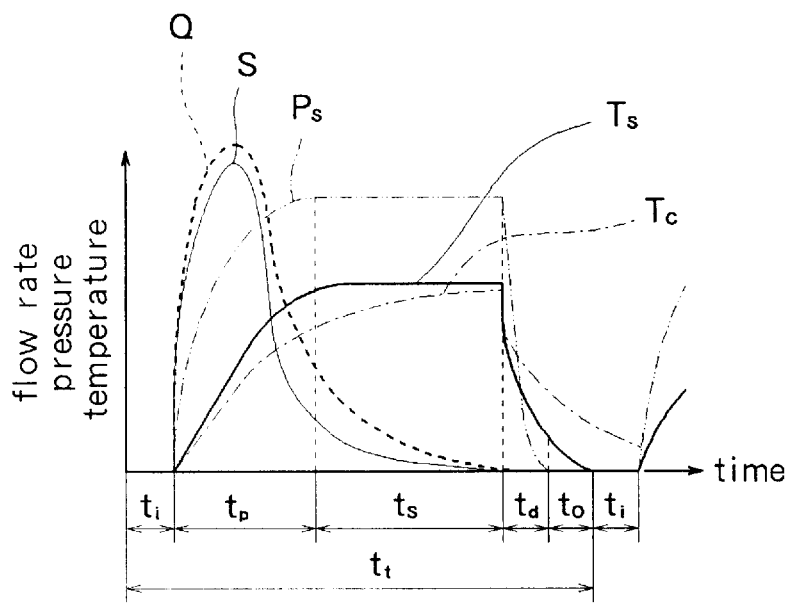
FIG. 2 is a schematic diagram illustrating changes in pressure and temperature during aging.

An aging process with this apparatus is described according to FIG. 2 showing temperature and pressure changes during the process.

(1) Charging process

The top lid 2a of the pressure vessel 1 is opened, steel-making slag crushed by the crusher 7 to a certain grain size is charged from the chute 6 into the pressure vessel 1 via the conveyor 8, and the top lid 2a is closed to seal the pressure vessel 1. (Required time $t_i$) Temperature and pressure in the pressure vessel 1 do not change at this step.

(2) Heating and pressurizing process

By opening the valve 4 the steam at 2 to 10 kg/cm$^2$ is supplied from the steam generator 3 to the pressure vessel 1. The steam is condensed into hot water by contact with the internal wall of the pressure vessel and the steel-making slag and thereby transferring its latent heat to the pressure vessel 1 and the steel-making slag. Thereby the average temperature Tc of the steel-making slag and the pressure vessel 1 is raised. Said raising of the average temperature Tc allows the elevation of the internal pressure Ps of the steam. The generating rate of the hot water is large until the pressure vessel and the steel-making slag are heated enough. Hot water accumulated in the vessel 1 soaks slag in the lower portion of the vessel interrupting heat transfer of latent heat from the steam to the steel-making slag. Consequently, the temperature rising rate of steel-making slag is decreased. This hot water is discharged from the lower portion of the pressure vessel 1 via the pipe 10 equipped with the steam trap 9 so as to prevent the above-mentioned disadvantage. The amount of discharged hot water corresponds to the amounts of generating rate of hot water. (Required time $t_p$)

(3) Temperature holding process

Since the pressure of the steam supplied from the generator 3 is kept constant, the increase of the pressure Ps in the vessel decreases the amount Q of the steam supplied from the generator 3, thus decreasing the generating rate of hot water S generation. The pressure Ps in the vessel soon becomes nearly equal to the pressure of the steam supplied from the steam generator 3. In this condition, steam is supplied and the hot water is discharged continuously to keep the temperature and the pressure at a predetermined value for time Ts to promote hydration. As the hydration CaO+H$_2$O→Ca(OH)$_2$ proceeds, the steam flow rate Q decreases. (Required time $t_s$)

(4) Pressure reducing process

Upon completion of the aging process, the valve 4 is closed and the valve 11 is opened. The steam in the pressure vessel 1 is thus released to the atmosphere from the upper portion of the pressure vessel 1 via the pipe 12 to reduce the pressure Ps in the pressure vessel 1 to atmospheric pressure. The average temperature $T_c$ is lowered. (Required time $t_d$)

(5) Discharging process (Required time $t_o$)

Finally, by opening the bottom lid 2b of the pressure vessel 1, the slag in the pressure vessel is discharged in the slag container 13, so that the average temperature Tc of the slag and the vessel 1 decreases as well as the condensing temperature Ts of steam.

Aging is completed according to the above steps. Thereafter, both the bottom lid of the pressure vessel 1 and the valve 11 are closed so that the above-mentioned processes (1) to (5) are repeated and the next aging of slag is started.

The duration required for aging of slag is classified into $t_i$, $t_p$, $t_s$, $t_d$ and $t_o$. The total of duration required for aging is shown by tt.

The steel-making slag used in the charging process (1) includes reduced slag and oxidized slag generated from a converter or an electric smelter and a mixture thereof. Although a slightly preheated slag or the like may be used, the temperature of the slag should be such a level as to allow the slag to be transferred by an unsealed container or the like, that is, at most 200° C. or less. It is desirable that the material slag should be crushed to a grain size of up to 25 mm in diameter depending on the standards of aggregate for road materials. Since the grains tend to collapse during aging, the size of the grain may be made slightly larger. However, it is desirable that crushing should be performed to the extent that slag having a grain diameter of 25 mm or less which constitutes 80% or more of the total amount. If the grain diameter of the slag is too large, as the unslaked lime at the grain surface layer becomes slaked lime, the hydration reaction of the unslaked lime in the grains hardly proceeds, and the aging time may be extended.

In the above mentioned heating and pressurizing process (2), considering the prevention of the adverse reaction in the chemical equilibrium of the hydration reaction (CaO+H$_2$O→Ca(OH)$_2$) and decrease of hydration speed, it is desirable that the temperature of the steam should be in the range of 130° to 190° C., and the pressure of the steam should be in the range of 2 to 10 kg/cm$^2$G.

The pressure and temperature of saturated steam to be supplied into said pressure vessel 1 may be appropriately determined by the amount of supplied slag, the ratio of water swelling of the slag, and the ratio of free lime contained in the slag.

Aging can be completed in a very short time by retaining slag in saturated steam. This is accomplished since condensation heat is transmitted by high-pressure steam having entered voids between grains and voids in grains. Accordingly, nearly identical pressure and nearly equal condensation temperature are obtained in even fairly minute voids since the heat transmission speed of condensation heat transmission is far higher than that of convective heat transmission.

Figure 3:
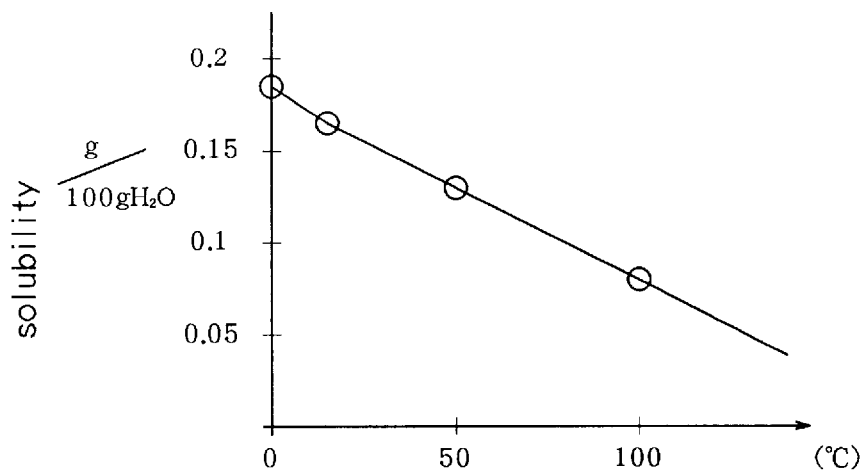
FIG. 3 is a diagram illustrating a solubility curve of slaked lime.

The solubility of slaked lime (Ca(OH)$_2$) generated by hydration reaction in water decreases as the temperature rises as shown in FIG. 3. When low-temperature hot water containing a high concentration of slaked lime, which is generated in the initial stage of the temperature-raising process, is retained in the pressure vessel, the hot water is mixed with higher-temperature hot water generated as the temperature raising process proceeds, and the average temperature ($T_w$) rises. As a result, the solubility of the slaked lime lowers, and excessive slaked lime is precipitated which deposits and adheres to the wall of the pressure vessel and then grows. This problem can be solved by a method of the present invention, that is, a method of supplying steam and discharging hot water simultaneously in the heating and pressurizing process.

Slag having normal temperature is used as material slag as a rule. Although slag slightly heated by preheating or the like may be used, the temperature of the slag should be such a level as to allow the slag to be transferred by a belt conveyor or the like, that is, at most 200° C. or less. High-temperature slag just discharged from a smelter and coagulated, having a temperature of as high as 1000° C., is not desirable.

It is desirable that the material slag should be crushed to a grain size of up to 25 mm in diameter depending on the standards of aggregate for road materials. Since the grains collapse during aging, the size of the grain may be made slightly larger. However, it is desirable that crushing should be performed to the extent that slag having a grain diameter of 25 mm or less constitutes 80% or more of the total amount. If the grain diameter of the slag is too large, as the unslaked lime at the grain surface layer becomes slaked lime, the hydration reaction of the unslaked lime in the grains hardly proceeds, and the aging time may be extended.

Since the saturation temperature of steam is determined by the pressure of the steam and the speed of the hydration reaction increases at higher temperature, the pressure of the steam should be higher. Accordingly, it is desirable that the pressure of the steam should be 2 kg/cm$^2$G or more.

Figure 4:
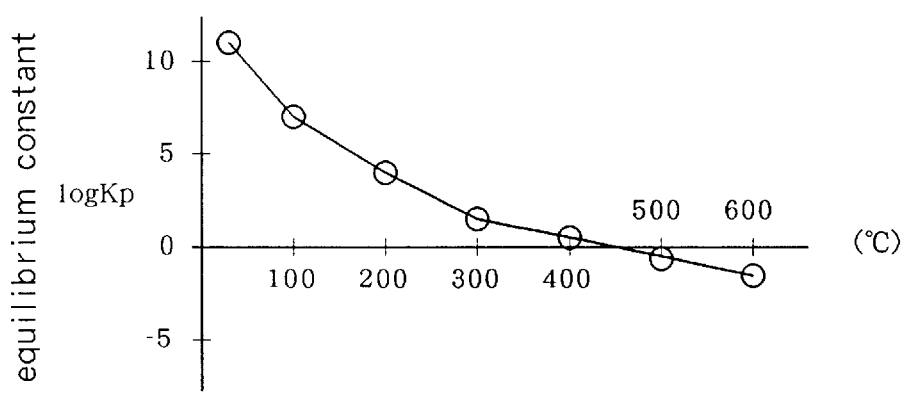
FIG. 4 is a diagram illustrating changes in equilibrium constant of hydration reaction with respect to temperature.

However, as shown in FIG. 4, the equilibrium constant $K_p$ of the hydration reaction $(CaO+H_2O \rightarrow Ca(OH)_2)$ becomes smaller at higher temperature. The value becomes minus at a temperature of 450° C. or more. At such a high temperature 450° C., rather than the hydration reaction, a reaction proceeds, wherein slaked lime resolves and unslaked lime is generated. This indicates that the ratio of free lime which causes the hydration reaction is reduced finally and that products cooled to normal temperature may still swell, although the reaction proceeds promptly at a high temperature of nearly 450° C. Furthermore, as the pressure is raised, the rising rate of the saturation temperature corresponding to the rising rate of the pressure decreases, and a more expensive pressure vessel is necessary in order to bear the high pressure. Therefore, it is desirable that the pressure of the steam should be 10 kg/cm$^2$G or less.

As disclosed in Japanese Laid-Open Patent Publication No. Hei 5-238786, when processing slag containing 6.1% of free lime and having a swelling ratio of 3%, the required time ($t_s$) for the temperature holding process is 3 hours at PS=2 kg/cm$^2$G. According to the results of separate experiments conducted for slag having a swelling ratio of 6% by the inventors of the present invention, the required time ($t_s$) for the temperature holding process was 2 hours at PS=5 kg/cm$^2$G. The above-mentioned facts reveals that the required time for aging can be saved by making the pressure of steam high. Taking a facility investment into consideration, the desirable and effective range of steam pressure for shortening aging time is between 5 kg/cm$^2$G and 10 kg/cm$^2$G. Judging from the results, it is desirable that the temperature holding time should be one hour or more and five hours or less from the economic point of view, although the time also depends on the composition of slag and pressure condition.

The amount of slag to be processed is determined because of the following reasons. When slag is processed on an industrial scale, it is desirable that slag should be processed as much as possible at a time. However, if the amount to be processed at a time is excessive, the time required for the charging, heating, pressurizing and discharging processes is prolonged because of limitations in the capabilities of a steam generator, material slag processing/supplying facilities such as a crusher, slag product transfer facilities, etc. To secure a desired production capacity (daily production amount: 1000 tons for example), the pressure vessel is required to have a larger capacity. This reduces the effect of the shortened aging time (the time required for the temperature holding process). Also, to prevent the time required for the charging, heating, pressurizing and discharging processes from becoming excessive, the capabilities of a steam generator, material slag processing/supplying facilities such as a crusher, slag product transfer facilities, etc. must be made larger, thereby causing the entire system to be less economical.

By considering the container handling on the basis of the capabilities of hoist cranes, trucks, dump trucks, etc. it is assumed that the amount of slag to be charged into the pressure vessel at a time should be in the range of 10 to 50 tons.

When the amount of slag to be processed is larger than the above-mentioned value, it is appropriate that the number of pressure vessels should be increased.

Furthermore, slag processing is made economical when the processing time for a single operation is in a range of 2 to 6 hours. For example, when the amount of slag to be processed at a time is 40 tons, the processing time for a single operation is 4 hours, and four pressure vessels are used, 40 tons/(per vessel in 4 hours)×24 hours×4 vessels= 960 tons can be produced daily.

The time required for the charging and discharging processes is useless since this time is spent holding the inner pressure of the pressure vessel at atmospheric pressure. Therefore, this time should be made as short as possible so that the pressure vessel can operate at a higher net operation rate. However, it is preferable that this time should be at least ten minutes. The upper limit of this time should be less than 30 minutes to ensure economical operation.

The time required for the heating and pressurizing process is determined by the capability of a steam generator, preheating and other factors. By using a higher number of smaller pressure vessels, the flow rate of steam at the peak time of the operation can be reduced. When 40 tons is processed at a time, about two tons/hour is enough as the steam generation capability of the steam generator to obtain 5 kg/cm$^2$G in an hour in the heating and pressurizing process. Accordingly, the time required for the heating and pressurizing process should be 30 minutes or more and 2 hours or less to ensure economical operation.

Figure 5:
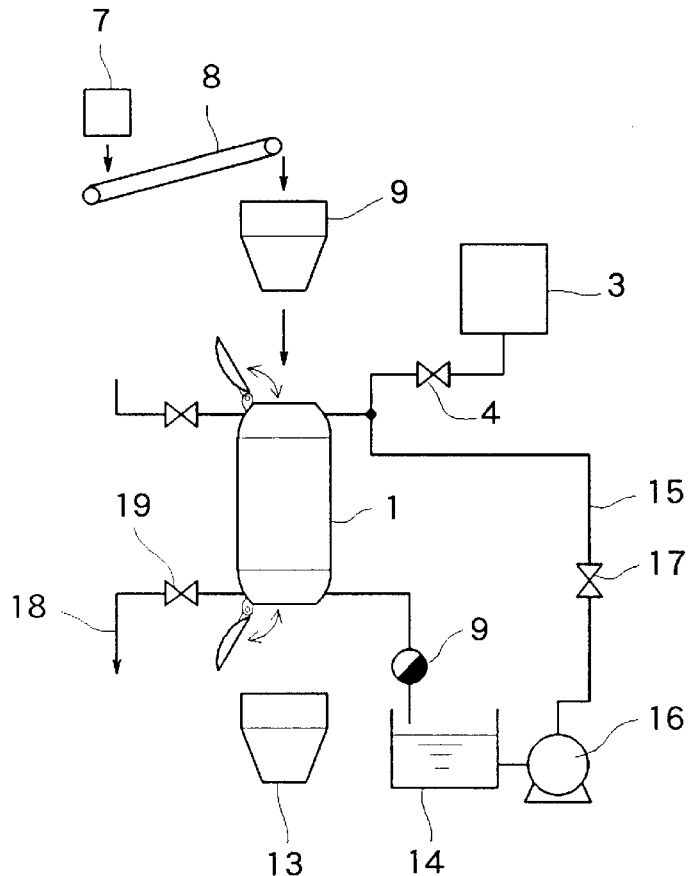
FIG. 5 is an overall structural view illustrating another embodiment of a steel-making slag aging apparatus of the present invention.

FIG. 5 shows the schematic structure of the apparatus of the second embodiment of the invention, i.e, the embodiment 2.

This embodiment relates to a technology which reuses the hot water having been condensed and discharged in the above-mentioned embodiment 1 to preheat the pressure vessel and slag. This apparatus is made by adding the following devices to the apparatus shown in FIG. 1. A hot water storage tank 14 is installed subsequent to the steam trap 9. In addition, a pump 16 and a valve 17 are installed along a pipe 15 subsequent to the hot water tank 14. The pipe 15 is connected to the upper portion of the pressure vessel 1. Furthermore, another pipe 18 is connected to the lower portion of the pressure vessel 1, and the pipe 18 is equipped with a valve 19.

Figure 6:
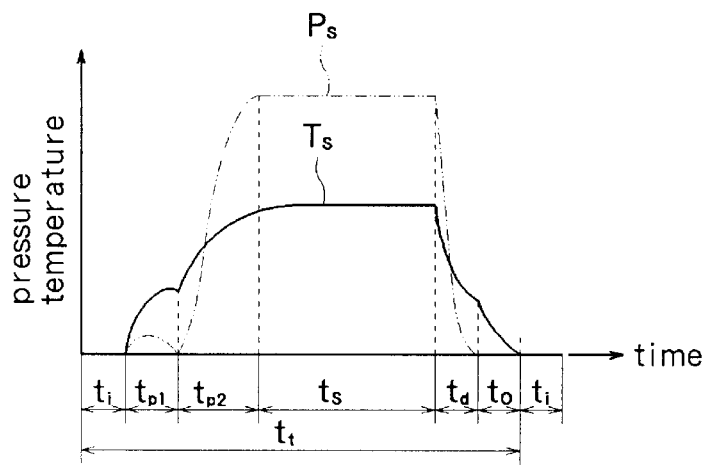
FIG. 6 is a schematic diagram illustrating changes in pressure and temperature during aging by the apparatus shown in FIG. 5.

A method of aging steel-making slag by using the apparatus constructed as described above will be described below referring to FIG. 5 and FIG. 6 which shows changes in pressure and temperature in each process.

(1) Charging process

The operations in this process are identical to those performed for the embodiment 1.

(2) Hot water preheating process

Hot water having been discharged from the lower portion of the pressure vessel 1 via the steam trap 9 and retained in the hot water storage tank 14 in the preceding process is pumped by the pump 16 and supplied to the upper portion of the pressure vessel 1 via the pipe 15, then sprinkled to the slag in the pressure vessel. At the same time, the valve 19 is opened, and the hot water having passed through the slag layer is discharged outside the pressure vessel via the pipe 18 (Required time $tp_1$).

(3) Heating and pressurizing process

The valve 4 is opened, and the operations identical to those performed for the embodiment 1 are performed. (Required time $tp_2$) However, the hot water discharged from the steam trap 9 is stored in the hot water storage tank 14.

(4) Temperature holding process

The operations in this process are identical to those performed for the embodiment 1.

(5) Pressure reducing process

The operations in this process are identical to those performed for the embodiment 1.

(6) Discharging process

The operations in this process are identical to those performed for the embodiment 1.

The effects of the embodiment 2 constructed as described above will be described below.

The sensible heat of the hot water can be recovered as a preheating source. Part of easy-to-flow fine particle can be removed by washing slag with the hot water. Problems such as clogging at the steam trap 9 hardly occur. The temperature of the hot water is lowered by preheating slag and the solubility of slaked lime rises as shown in FIG. 3. Therefore, the danger of the slaked lime depositing and adhering to the interior of the pressure vessel is reduced. The hot water in the storage tank 14 is raised in temperature by the hot water at higher temperature flowing later into the tank, so the average water temperature may rise. However, since the pressure in the tank is atmospheric pressure, the water temperature is held at 100° C. or less and the fluctuation of the temperature is small. Therefore slaked lime has difficulty in adhering. Even if slaked lime adheres, countermeasures can be taken easily.

Figure 7:
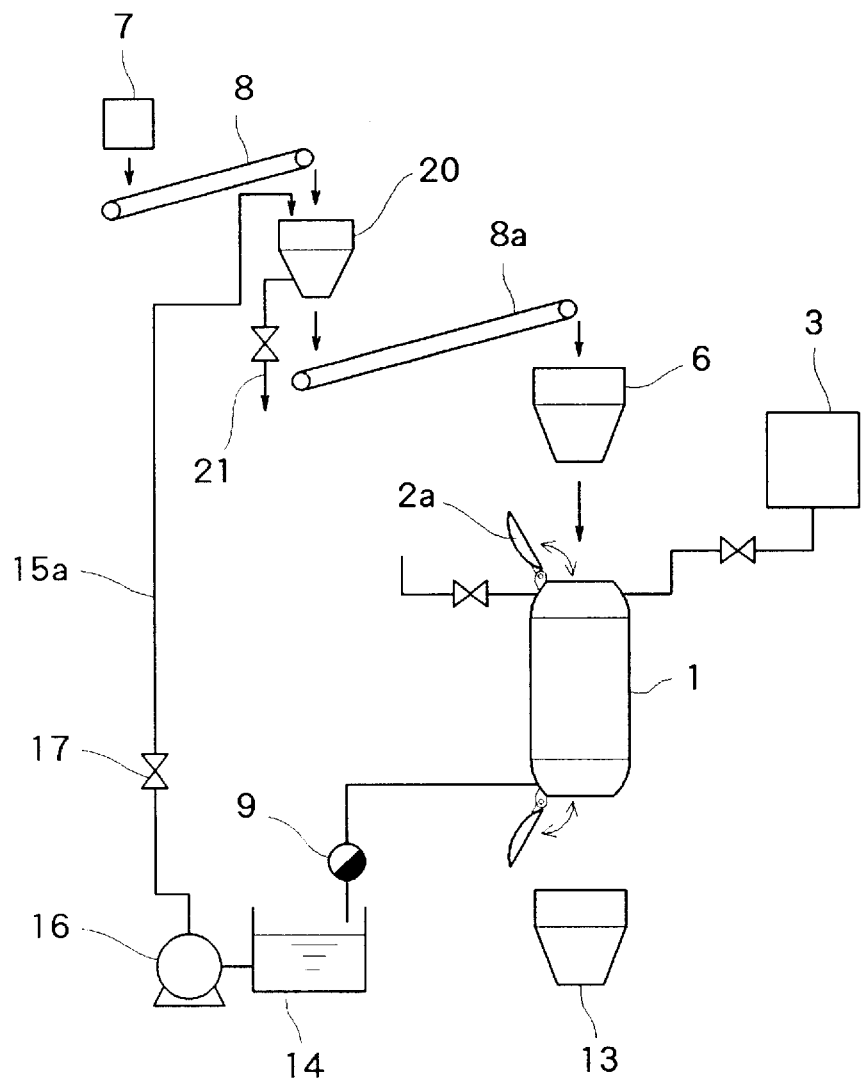
FIG. 7 is an overall structural view illustrating still another embodiment of a steel-making slag aging apparatus of the present invention.

FIG. 7 is the schematic structure of the apparatus of the embodiment 3.

This embodiment relates to a technology which reuses the hot water having been condensed and discharged in the above-mentioned embodiment 1 to preheat slag. This apparatus is made by adding the following devices to the apparatus shown in FIG. 1. A hot water storage tank 14 is installed subsequent to the steam trap 9. In addition, a pump 16 and a valve 17 are installed subsequent to the hot water storage tank 14, along a pipe 15a. The pipe 15a is extended to an unprocessed slag container 20 ahead of a chute 6. A conveyor 8a is installed between the slag container 20 and the chute 6.

A method of aging steel-making slag by using the apparatus constructed as described above will be described below referring to FIG. 7.

(1) Charging process

Hot water having been discharged from the lower portion of the pressure vessel 1 via the steam trap 9 and retained in the hot water storage tank 14 in the preceding process is pumped by the pump 16 and sprinkled via the pipe 15a into the slag container 20 accommodating steel-making slag crushed by the crusher 7 to the extent that slag having a grain diameter of 25 mm or less constitutes 80% or more of the total amount. At the same time, the hot water is discharged from the lower portion of the slag container 20 to the outside of the container 20 via a pipe 21. The top lid 2a of the pressure vessel 1 is opened. Preheated slag is charged into the pressure vessel 1 via the conveyor 8a and the chute 6. The top lid 2a is then closed to seal the pressure vessel 1.

(2) Heating and pressurizing process

The operations in this process are identical to those performed for the embodiment 1.

(3) Temperature holding process

The operations in this process are identical to those performed for the embodiment 1.

(4) Pressure reducing process

The operations in this process are identical to those performed for the embodiment 1.

(5) Discharge process

The operations in this process are identical to those performed for the embodiment 1.

The embodiment 3 constructed as described above is effective in that the sensible heat of hot water can be used as a preheating source and that the problem of steam trap clogging or the like can be prevented by the effect of washing slag in the same way as those for the embodiment 2. In addition, since preheating by hot water can be completed at a place different from the pressure vessel before the start of the charging process, it is expected that the processing time ($t_r$) for a single operation can be shortened by the amount of the required time ($tp_1$, see FIG. 6) for the hot water preheating process in the case of the embodiment 2.

Figure 8:
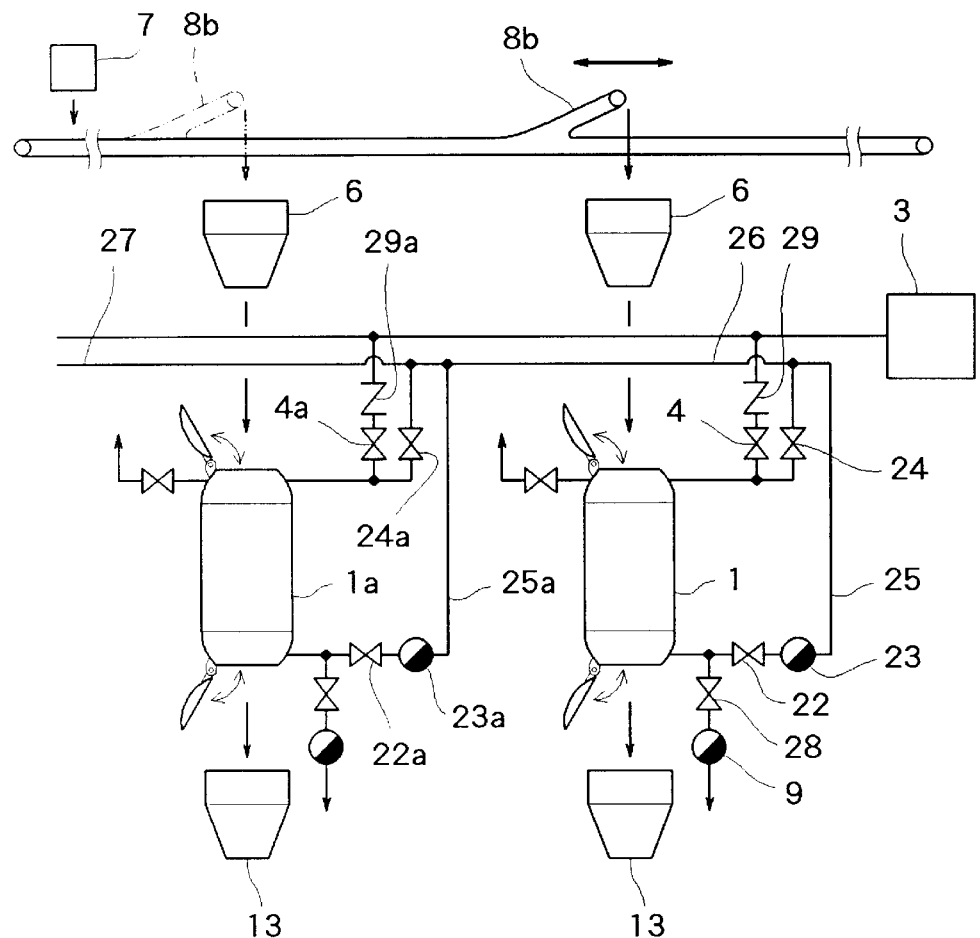
FIG. 8 is an overall structural view illustrating yet another embodiment of a steel-making slag aging apparatus of the present invention.

FIG. 8 shows the schematic structure of the apparatus of the embodiment 4.

The present embodiment relates to a technology, wherein a plurality of pressure vessels are used, the upper portions and the lower portions of these pressure vessels are connected so as to communicate with one another, and hot water generated in a pressure vessel can be flowed into other pressure vessels. As shown in FIG. 8, a plurality of pressure vessels (1, 1a, . . . ) are used. Two pressure vessels 1 and 1a are adjacent to each other. The lower portion and the upper portion of the pressure vessel 1 are connected to each other via a pipe 25 equipped with a valve 22, a steam trap 23 and a valve 24. The lower portion and the upper portion of the other pressure vessel 1a are connected to each other via a pipe 25a equipped with a valve 22a, a steam trap 23a and a valve 24a. Furthermore, the pipe 25 is connected to the pipe 25a via a pipe 26.

Figure 9:
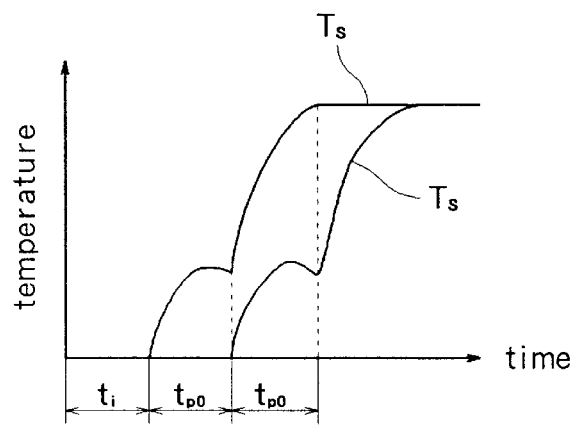
FIG. 9 ia a schematic diagram illustrating changes in temperature during aging by the apparatus shown in FIG. 8.

A method of aging steel-making slag by using the apparatus constructed as described above will be described below referring to FIG. 8 and FIG. 9 which shows changes in temperature in the processes.

(1) Charging process

A belt conveyor 8b equipped with a movable tripper as a charging means is used. The tripper is moved just above the pressure vessel 1. Steel-making slag crushed by the crusher 7 to the extent that slag having a grain diameter of 25 mm or less constitutes 80% or more of the total amount is charged into the pressure vessel 1, and the pressure vessel 1 is sealed.

(2) Hot water preheating process

The valve 24 on the pipe 25 communicating with the upper portion of the pressure vessel 1 is opened. Hot water discharged from other pressure vessels which are now in the heating and pressurizing process described later is flowed into the upper portion of the pressure vessel 1 via pipes 27, 26. Hot water flowing down while preheating the slag layer is discharged from the steam trap 9 by opening a valve 28 provided below the vessel. (Required time $tp_0$)

(3) Heating and pressurizing process

In the same way as that for the embodiment 1, heat is supplied to pressure the pressure vessel 1. By opening the valve 22, hot water discharged from the lower portion of the vessel is supplied to the pipes 25, 26, and by opening the valve 24a, the hot water is supplied to the upper portion of the pressure vessel 1a which is now in the hot water preheating process.

In the initial stage of the heating and pressurizing process, the internal pressure of the pressure vessels is low. When steam is supplied to the pressure vessel from the same steam generator 3 as that used for other pressure vessels wherein the temperature holding process has started, the high pressure steam in the other pressure vessels flows into the pressure vessel 1 or 1a, and the temperature and pressure of the other pressure vessels may be lowered. This may cause the danger of inhibiting the progress of the temperature holding process. To prevent this problem, check valves 29, 29a are provided just ahead of the valves 4, 4a in the present embodiment.

(4) Temperature holding process

The operations in this process are identical to those performed for the embodiment 1.

(5) Pressure reducing process

The operations in this process are identical to those performed for the embodiment 1.

(6) Discharging process

The operations in this process are identical to those performed for the embodiment 1.

The effects of the embodiment 4 constructed as described above will be described below. Hot water storage tank and hot water pump are not required. Since hot water of 100° C. or more (at atmospheric pressure or more) can be directly used for preheating, the effect of preheating is significant. Even when the capability of the steam generator 3 is limited, the heating and pressurizing time can be shortened by sufficiently performing preheating. It is thus expected that the aging time ($t_t$) for a single operation can be shortened.

Figure 10:
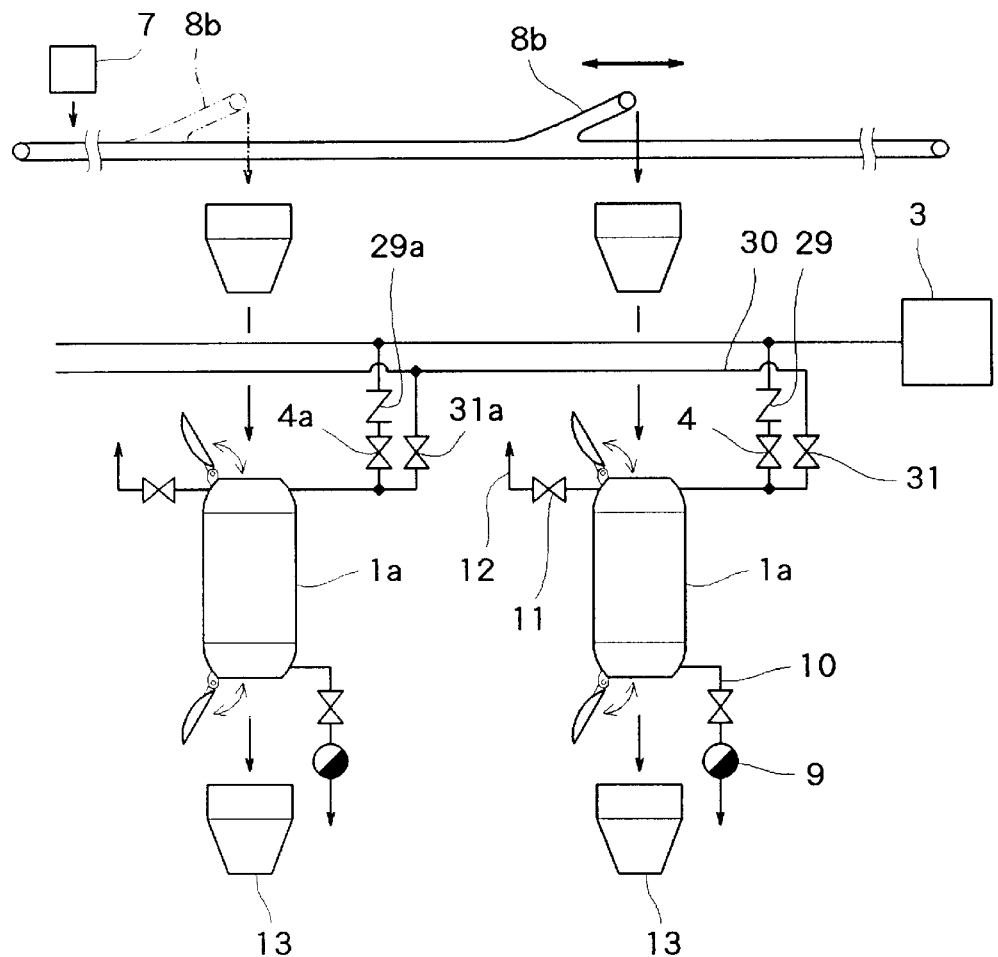
FIG. 10 is an overall structural view illustrating still yet another embodiment of a steel-making slag aging apparatus of the present invention.

FIG. 10 shows the schematic structure of the apparatus of the embodiment 5.

The present embodiment relates to a technology, wherein a plurality of pressure vessels are used. The upper portions of these pressure vessels are connected so as to communicate with one another. Hot water generated in a pressure vessel can be flowed into other pressure vessels. A plurality of pressure vessels (1, 1a, . . . ) are used. The upper portions of two adjacent pressure vessels 1 and 1a are connected to each other via a pipe 30. Valves 31, 31a are respectively provided at the upper portions of the pressure vessels 1, 1a along the pipe 30.

Figure 11:
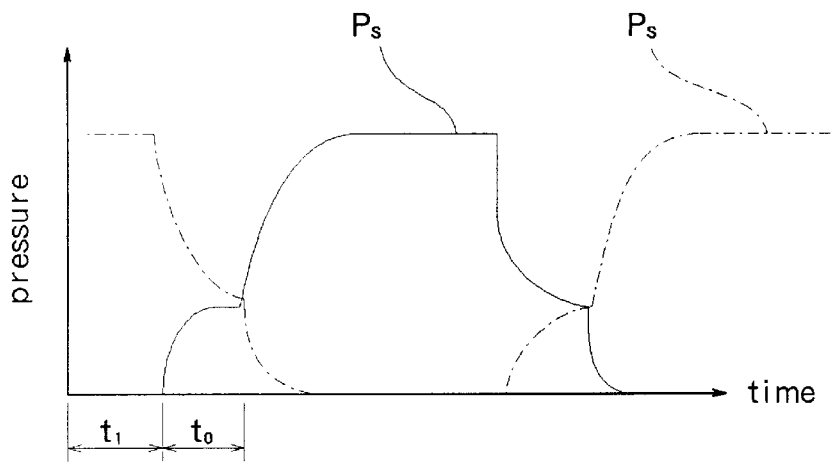
FIG. 11 is a schematic diagram illustrating changes in pressure during aging by the apparatus shown in FIG. 10.

A method of aging steel-making slag by using the apparatus constructed as described above will be described below referring to FIG. 10 and FIG. 11 which shows changes in pressure in processes.

(1) Charging process

The operations in this process are identical to those performed for the embodiment 4.

(2) Steam preheating process

Steam discharged from other pressure vessels 1a which are in the pressure reducing process described later is supplied into the pressure vessel 1 by opening a valve 31 and 31a, and slag and the vessel are preheated, and the interior of the vessel is preliminary pressurized. Condensed water generated at this time is discharged from the lower portion of the pressure vessel 1 to a pipe 10 via the steam trap 9.

(3) Heating and pressurizing process

The operations in this process are identical to those performed for the embodiment 1.

(4) Temperature holding process

The operations in this process are identical to those performed for the embodiment 1.

(5) Pressure reducing process

The valve 31 provided above the pressure vessel 1 is opened to release steam from the vessel to the pipe 30. The valve 31a is opened to supply said steam to the pressure vessel 1a which is now in the steam preheating process. After the pressure at the pressure vessel 1 is made equal to that at the pressure vessel 1a, and steam stops flowing, the valves 31, 31a are closed and the valve 11 is opened to discharge steam from the pipe 12 to the outside of the system and to reduce the internal pressure $P_s$ of the pressure vessel 1 to atmospheric pressure.

(6) Discharging process

The operations in this process are identical to those performed for the embodiment 1.

The effects of the embodiment 5 constructed as described above will be described below.

Steam discharged from a pressure vessel in the pressure reducing process can be used as a preheating source for another pressure vessel.

A considerable amount (70 to 90%) of heat supplied in the heating and pressurizing process and the temperature holding process is used to raise the sensible heat of the slag and the vessel, and an amount of 10 to 20% of the heat is stored as the sensible heat of hot water. The amount of heat remaining as high-pressure steam in the vessel is scarce. Therefore, the advantage of heat recovery by recovering only the steam remaining in the vessel is small. Therefore it is preferable to discharge steam from the upper portion of the pressure vessel in the pressure reducing step for increasing the efficiency of heat recovery. When steam is discharged from the upper portion of the pressure vessel as a method of reducing pressure, hot water retained at the bottom is vaporized, blown up and made to contact with the slag grains and the internal wall of the vessel and super heated, and then discharged. As a result, the amount of heat recovery increases.

Since the temperature of the slag discharged in the discharging process is lowered, the slag thus produced can be handled easily.

Since steam is discharged outside the system after the internal pressure of the vessel is lowered somewhat, the problem of generating noise and white fumes occurs rarely.

Figure 12:
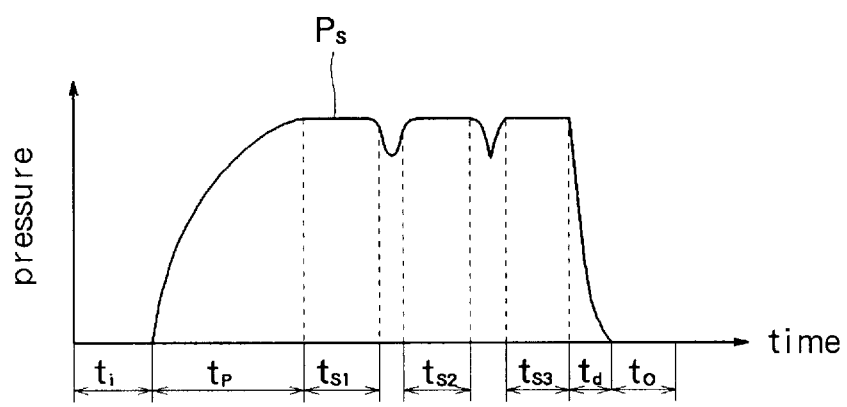
FIG. 12 is a schematic diagram illustrating changes in pressure when the pressure in a pressure vessel is reduced temporarily in the temperature holding process.

FIG. 12 shows the aging method of the present invention and the changes in pressure in the processes of the embodiment 6.

The present embodiment relates to a technology wherein the pressure in the temperature holding process is lowered temporarily during operation of the embodiment 1. The schematic structure of the apparatus of the present embodiment is the same as that shown in FIG. 1. The aging method in accordance with the present embodiment is described below.

The operations in this charging process (1), heating and pressurizing process (2), temperature holding process (3), pressure reducing process (4) and discharging process (5) are identical to those performed for the embodiment 1.

In the middle of the temperature holding process (3), in the same operation as in the embodiment 1, the valve 11 is opened for a short time to release steam from the pressure vessel 1 and to slightly reduce the internal pressure of the pressure vessel 1 temporarily. This operation is performed once or more. The total time for the temperature holding process wherein the valve 11 is not opened is one hour or more and five hours or less ($t_{s1}+t_{s2}+t_{s3}$ in FIG. 12).

The effects of the embodiment 6 constructed as described above will be described below.

In the slag grains having large diameters, the temperature at the central portions of the grains is not raised quickly.

Furthermore, Ca(OH)2 develops on the grain surface layers, and the central portion of the grains may sometimes not be subjected to an hydration reaction. The high-pressure steam and hot water in the slag grains are expanded by the operation described above, thereby widening the voids in the grains and sometimes collapsing the grains at the time as spouting out of the grains. Therefore, the central portions of the grains, wherein hydration reaction has not progressed sufficiently because of large size, become exposed to the steam and aging proceeds promptly.

Figure 13:
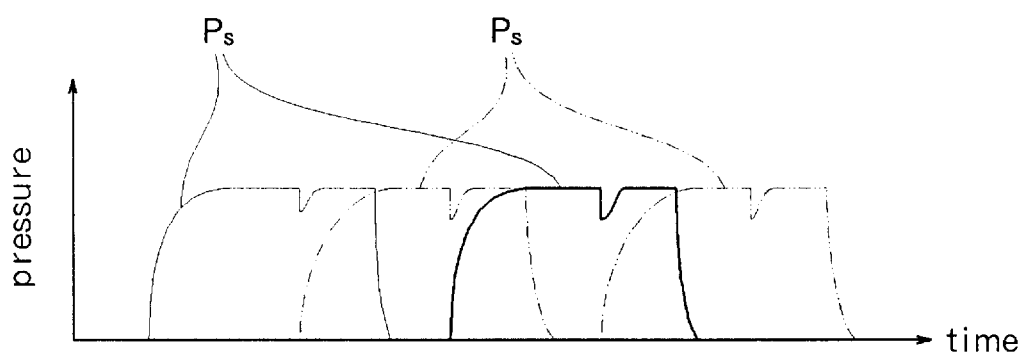
FIG. 13 is a schematic diagram illustrating changes in pressure when two pressure vessels are communicated with each other.

FIG. 13 shows the apparatus and the method for aging slag of the present invention and the change in pressure in the operation of the embodiment 7. The embodiment 7 relates to a technology, wherein the pressure reducing operation in the embodiment 6 is applied to a plurality of pressure vessels.

The present embodiment relates to a technology wherein a plurality of pressure vessels are used and they are connected so as to communicate with one another. The apparatus of the embodiment corresponds to the structure shown in FIG. 10, but the check valves (29, 29a, . . . ) are removed from the pipes (30, . . . ) and the valves (4, 4a, . . . ) are provided.

In the slag aging operation provided in the same way as in the embodiment 6, at least two of a plurality of pressure vessels are used so that the aging process of one of the pressure vessels is shifted by one process from the aging operation of the other pressure vessel. In other words, the pressure vessel 1 starts the heating and pressurizing process, the pressure vessel 1a communicating with the pressure vessel 1 is in the middle of the temperature holding process of the aging operation. As a result, the internal pressure of the pressure vessel 1a in the middle of the temperature holding process is slightly reduced temporarily.

In addition to the effects of the embodiment 6, the embodiment 7 is effective in that heat efficiency can be improved and the problem of generating noise and white fumes occurs rarely since the steam discharged in the temperature holding process is recovered by other pressure vessels.

Now, detailed explanation is made about the general configuration of a steel-making slag aging apparatus for aging steel-making slag contained in an unsealed container put in a lateral cylindrical pressure vessel according to an embodiment 8 of the invention with reference to FIGS. 14 to 19.

Figure 14:
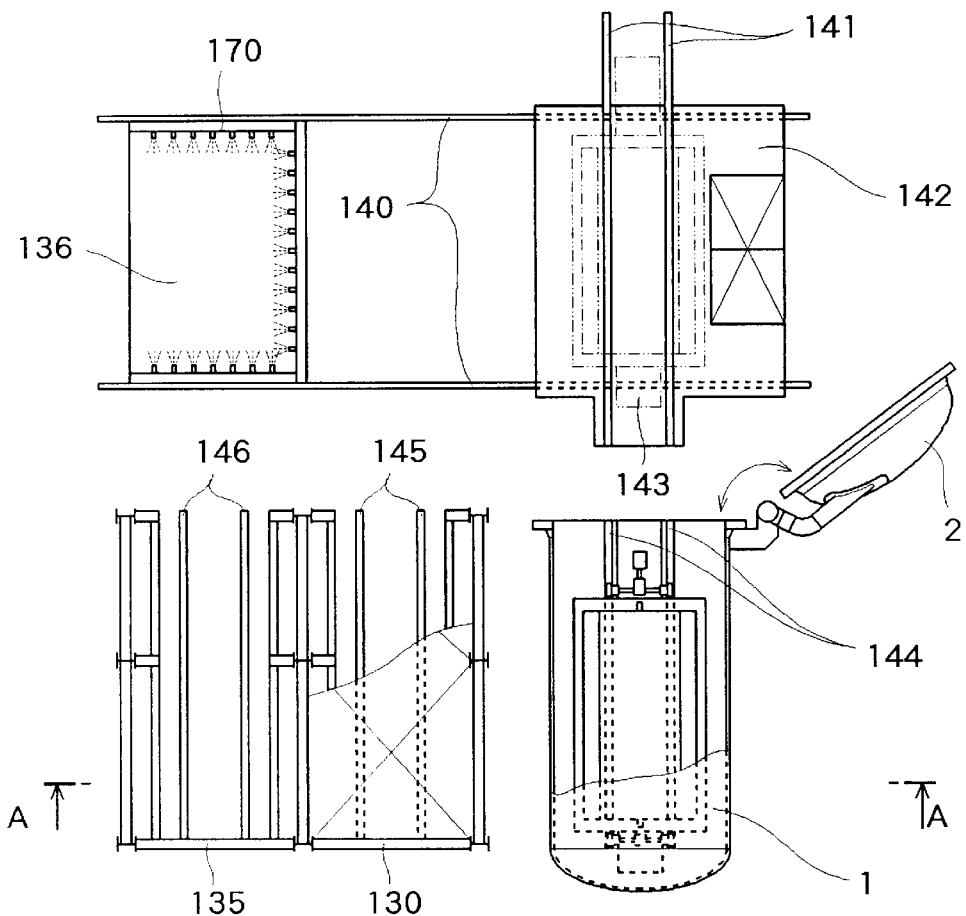
FIG. 14 is a partially (fragmentary) plane view illustrating an embodiment of a steel-making slag apparatus of the present invention.
Figure 15:
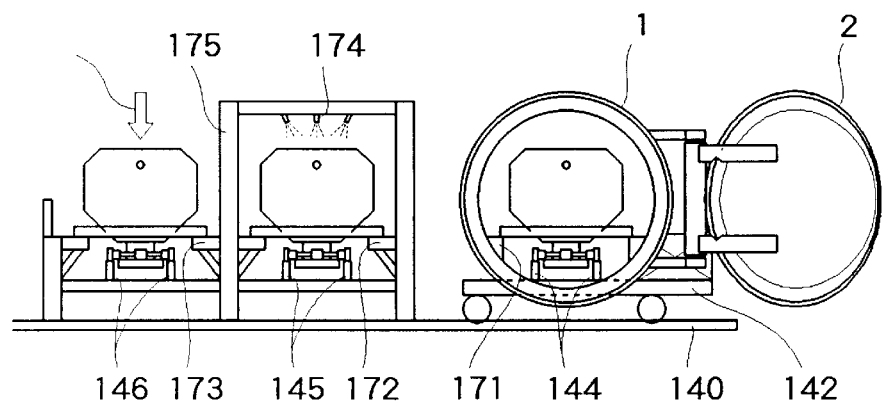
FIG. 15 is a sectional view taken substantially on line A—A of the apparatus shown in FIG. 14.

FIG. 14 is a plan view schematically showing a steel-making slag aging apparatus according to the invention, and FIG. 15 is a diagram of the apparatus of FIG. 14 as viewed from behind the pressure vessel.

A pressure vessel 1, a platform 130 and a charging table 135 are juxtaposed at the lower part of the page of FIG. 14. On the other hand, first rails 140 are laid in the direction perpendicular to the longitudinal direction of the pressure vessel 1 at the upper part of the page. The first rails 1 have mounted thereon a transverse truck 142 movable along the first rails. Second rails 141 parallel to the longitudinal direction of the pressure vessel 140 are mounted on the transverse truck 142. A lift carriage 143 is mounted on the second rails movably along the second rails. Numerals 171, 172 and 173 respectively designates a supporting stage.

A sprinkler 170 is arranged on a delivery pit 136 constituting a delivery port below the end of the first rails 140. As shown in FIG. 15, a sprinkler 174 is arranged also above the frame members 175 assembled above the platform 130.

Figure 16:
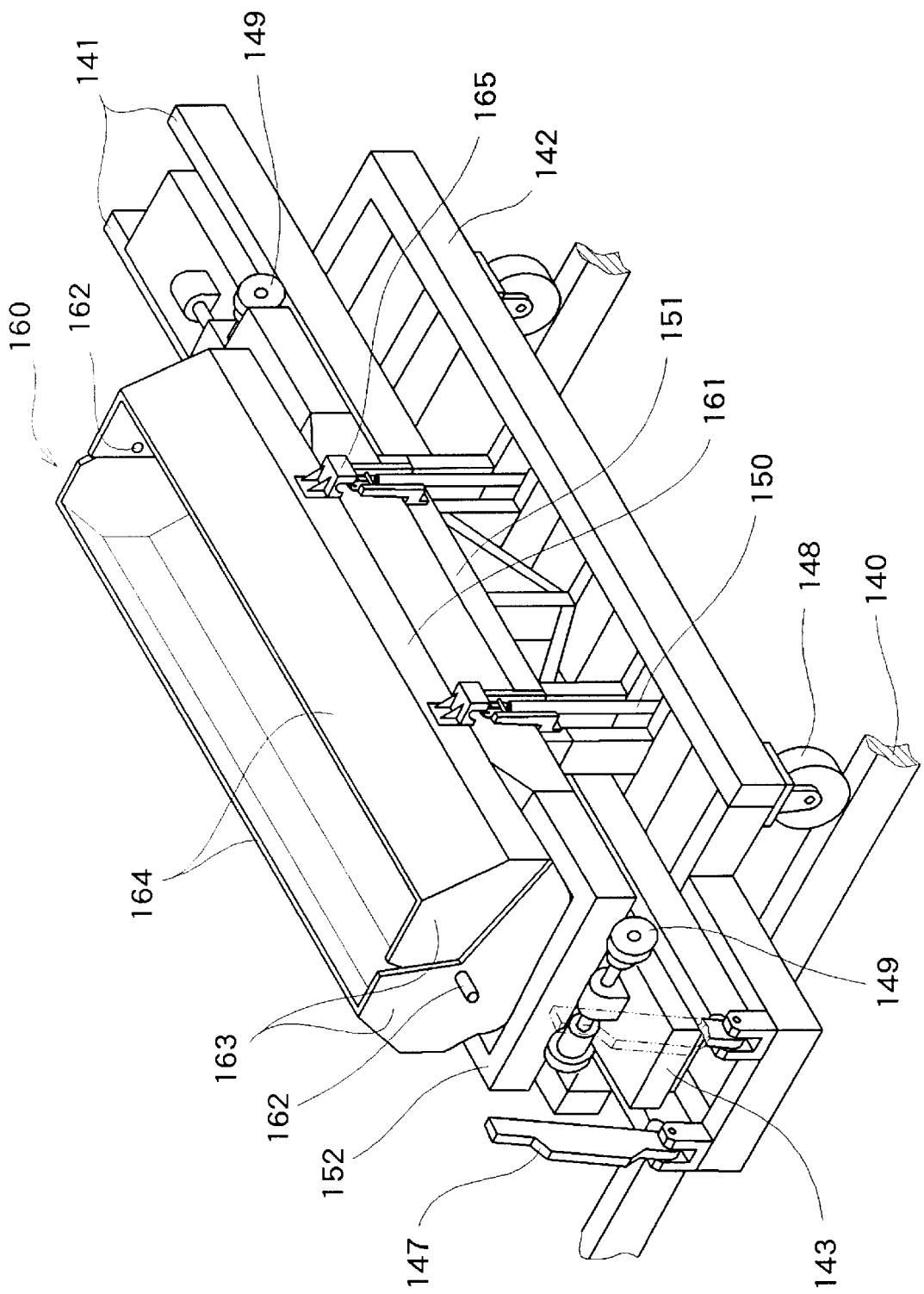
FIG. 16 is a perspective view of an embodiment of a steel-making slag aging apparatus of the present invention.
Figure 17:
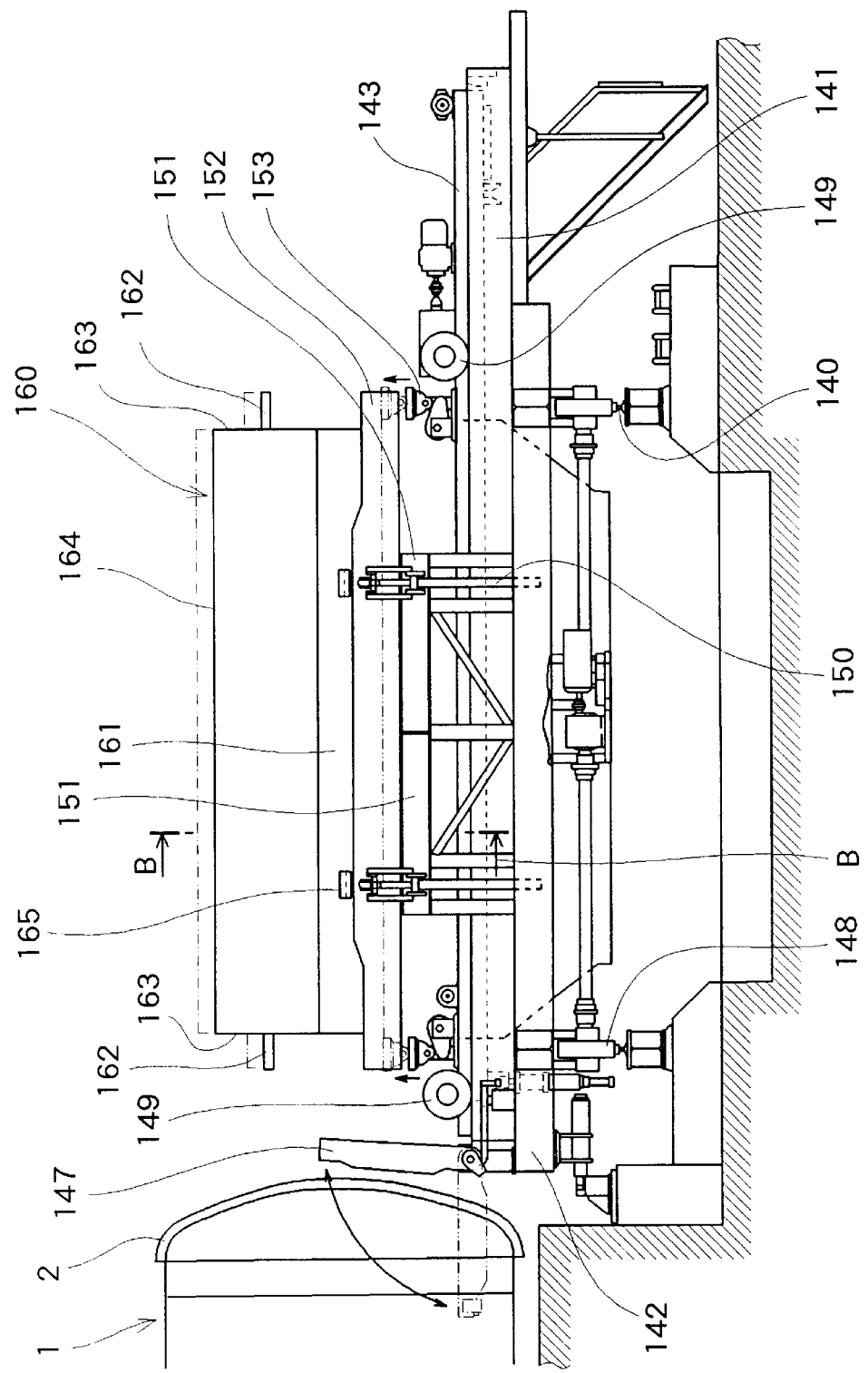
FIG. 17 is a side view of the apparatus shown in FIG. 16.

The detailed configuration of the transverse truck 142 and the parts above it is shown as a perspective view in FIG. 16 and as a side view in FIG. 17.

Castors 148 are mounted at the lower part of the transverse truck 142, which castors 148 are movable in the direction perpendicular to the longitudinal direction of the pressure vessel 1 shown in FIG. 14 along the first rails 140. Wheels 149 are also mounted on the upper side of the lift carriage 143, which wheels 149 are movable in the direction parallel to the longitudinal direction of the pressure vessel 1 along the second rails 141. Also, bridge rails 147 are mounted which are as wide as the second rails 141 and tiltably connected at the forward end of the second rails. The bridge rails 147, if tilted forward toward the pressure vessel, become connectable to the rails 144 in the pressure vessel 1 shown in FIG. 14, the rails 145 on the platform 130 and the rails 146 of the charging table 135. The lift carriage 143 is movable also forward toward the pressure vessel 1 farther from the first rails 140.

A lift 153 is fixedly arranged above the front and rear parts of the lift carriage 143 as shown in FIG. 17. Frame members 152, which are replaceably mounted at the upper part of the lift 153, can be moved in two directions vertically. Also, the frame members 152 are mountable on the mount 151 fixed on the transverse truck 142 when the lift 153 is not extended. When the lift 153 is extended, on the other hand, the frame members 152 can be lifted up to a position out of contact with the mount 151.

Figure 18:
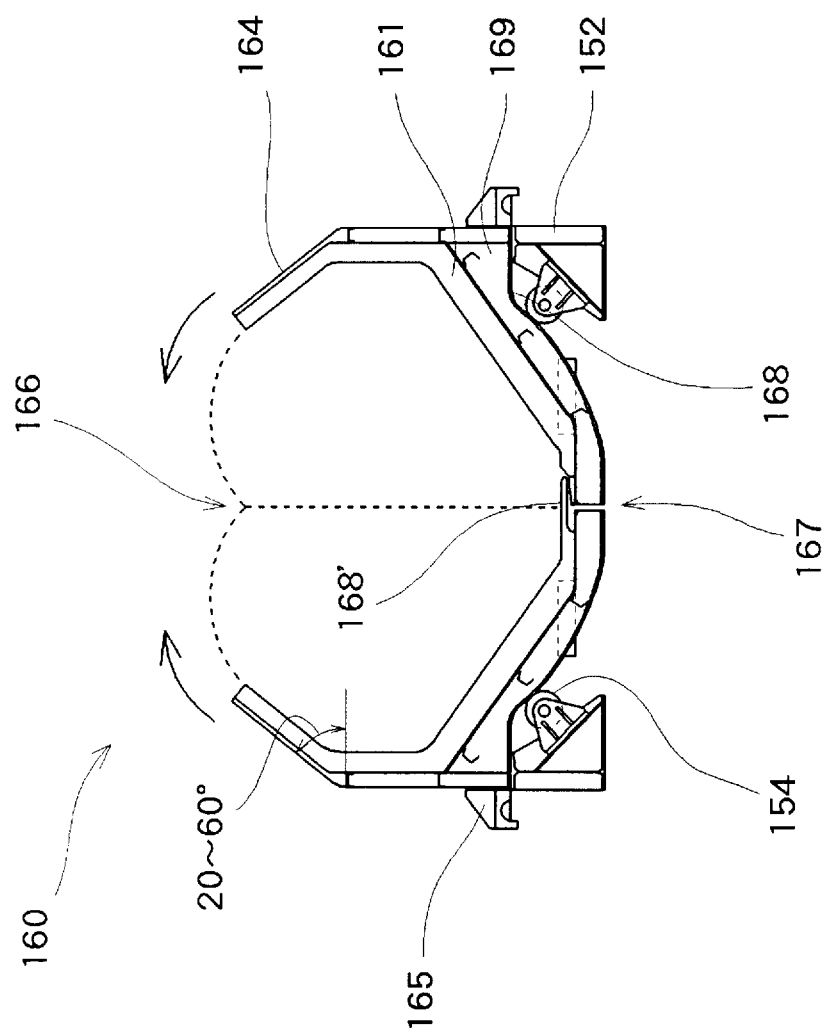
FIG. 18 is a sectional view taken substantially on line B—B of a frame member and unsealed container of the apparatus shown in FIG. 17.

The frame members 152 have inside thereof two longitudinally-distant pairs of rollers 154 each including a set of rollers (see FIG. 18). An unsealed container 160 is replaceably mounted in contact with the rollers 154. This unsealed container 160 includes a pair of substantially cylindrical housing members 161 with the bottom thereof openably assembled about the pivot 162, a closing plate 163 at each end of the housing members 161, and an upper plate 164 inclined above the housing members 161.

Each housing member 161 has on the side thereof an engaging member 165 protruded in such a manner as to engage the forward end of the oil-hydraulic cylinder 150 fixed on the transverse truck 142 when the forward end extends upward. As a result, with the extension of the hydraulic cylinder 150, the forward end of each cylinder engages the engaging member 165, whereby the engaging member 165 is pushed upward. The bottom of the housing members 161 supported rotatably by the pivot 162 is opened so that the contents in the unsealed container 160 (aged slag in this case) can be discharged downward. After steel-making slag is discharged, the hydraulic cylinder 150 is contracted, and then the bottom of the unsealed container 160 is rotated in the closing direction and closed under the weight of the housing members 161.

A sectional view of the unsealed container 160 taken in line B—B in FIG. 17 is shown in FIG. 18.

The main components of the unsealed container 160 are formed of substantially cylindrical right and left housing members 161. The housing members 161 are symmetrical in shape so that the load thereof with such contents as steel-making slag may be imposed uniformly over the unsealed container 160. Also, a bottom 168 is formed in cylindrical shape so that part of the bottom 168 may slide always in contact with the rollers 154 of the frame members 152 when opening portion 167 of the unsealed container 160 is opened or closed by means of the hydraulic cylinder 150. Further, the right and left housing members 161 are rotatively mounted by the pivot 162 shown in FIG. 17 at the center of the cylindrical shape of the bottom 168 thereof. As a result, the bottom 168 slides over the rollers 154 always about the pivot 162 when opening portion 167 is opened or closed, so that the track along which the unsealed container 160 is operated when opened or closed is kept fixed, thereby making stable opening and closing operation possible.

Taking the opening portion operability and the degree of difficulty of machining into consideration, the shape of the part of the bottom 168 at least lower than the contact point with the roller 154 is preferably cylindrical when the unsealed container is closed. Also, in order to prevent the unsealed container from moving excessively in the direction closing the bottom 168 resulting in the housing members 161 being overlaid one on the other, a stopper 169 is preferably arranged at the upper part of each contact surface with the rollers 154.

In order to accurately deliver the entire contents (aged slag) contained in the unsealed container 160, the rollers 154 are arranged on the frame members 152 preferably in such a manner that the operating angle of the housing members 161, i.e., the angle formed between the line from the pivot 162 to the center of the rollers 154 and the vertical line is at least 30 degrees, taking the angle of repose of steel-making slag contained in the unsealed vessel 160 into account.

Further, upper plates 164 are arranged on the unsealed container 160 to prevent slag from spilling off. The upper plates preferably form no obstacle in charging slag, and preferably are tilted at 20 to 60 degrees with respect to the horizontal plane taking into consideration the fact that steel-making slag is charged into a cylindrical pressure vessel.

As shown in FIG. 17, the unsealed container 160 has closing plates 163 at each end of the housing members 161 in order to prevent slag from spilling off from the ends thereof. Each closing plate 163 is in such a shape that slag does not spill off from the ends of the unsealed container 160 even when the opening portion 167 of the unsealed container 160 opens to the above-mentioned angle. In order to protect the opening portion 167 of the unsealed container 160, a bottom closing plate 168' is arranged on one of the housing members 161.

The unsealed container 160 is necessary to be in closed state unless exposed to an external force regardless of whether there are any contents therein.

Figure 19:
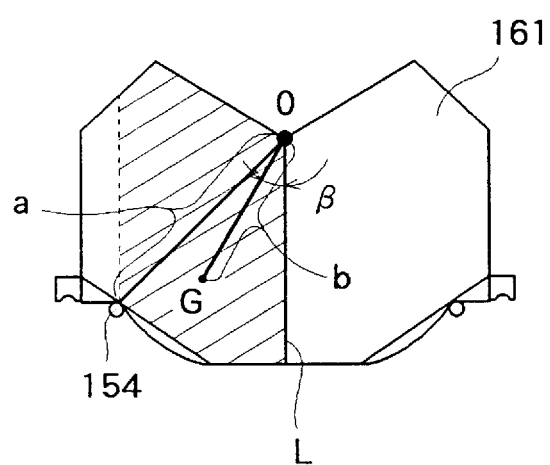
FIG. 19 is a schematic view illustrating the center of gravity of the unsealed container shown in FIG. 18.
Figures 20A, 20B:
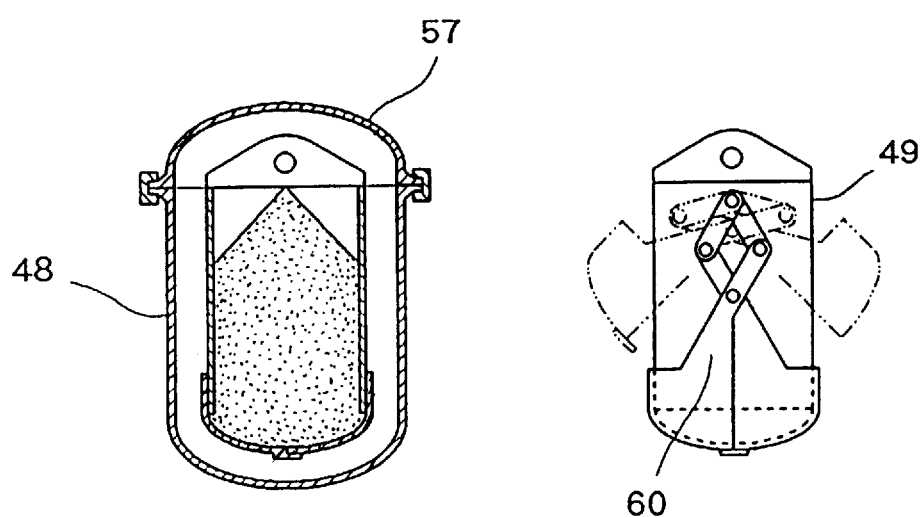
FIG. 20(a) is a sectional view of a pressure vessel accommodating an unsealed container.
FIG. 20(b) is a side view of the container.
Figure 21:
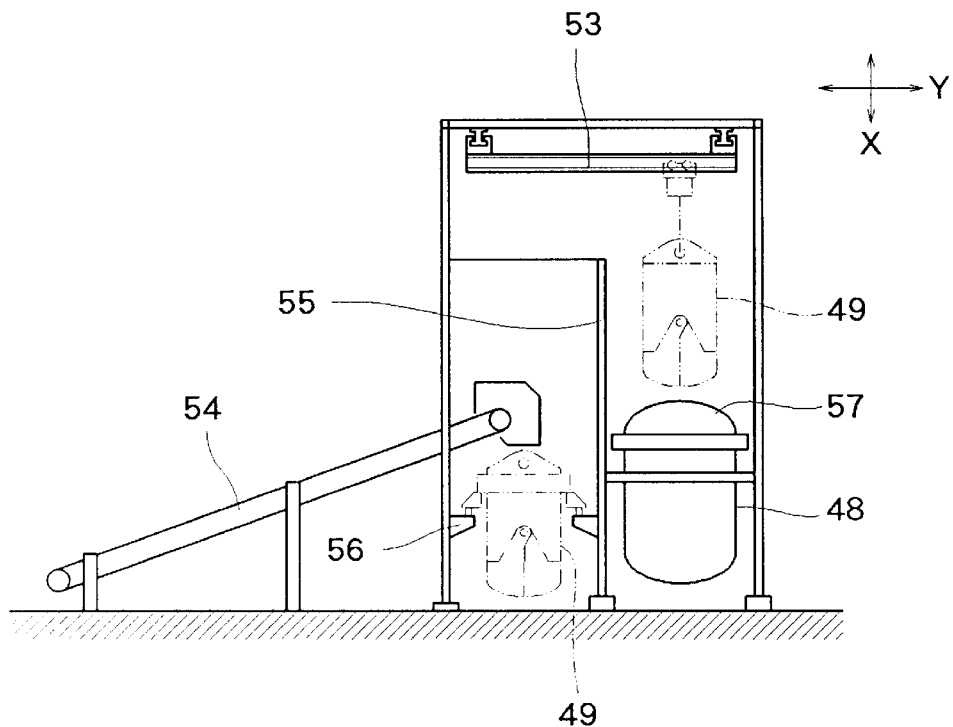
FIG. 21 is a side view illustrating still yet another embodiment of a steel-making slag aging apparatus of the present invention.
Figure 22:
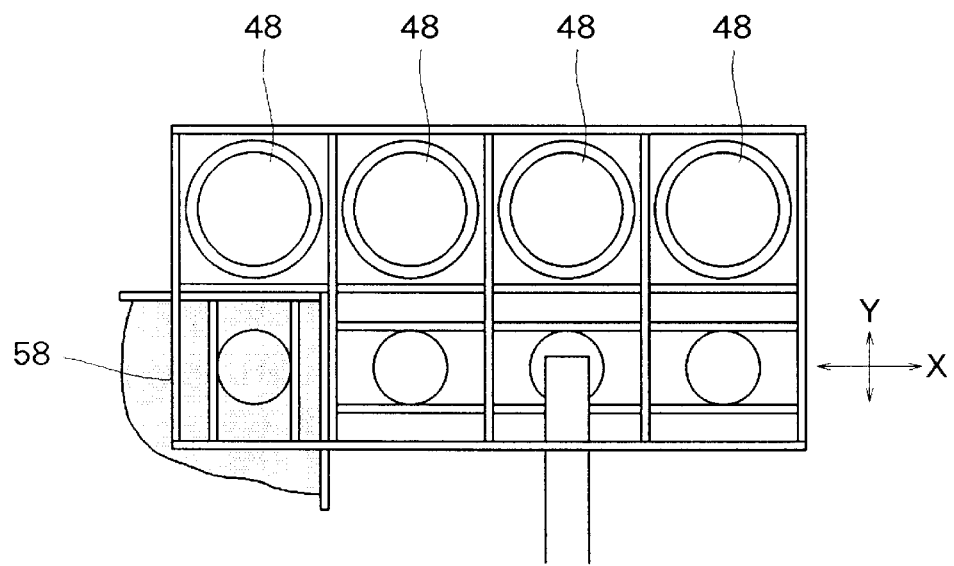
FIG. 22 is a plan view of the apparatus shown in FIG. 21.

For this object to be achieved, the housing members 161 are required to have the center of gravity thereof at such a position that a closing moment M is generated in a closing direction expressed by $M = Wb \times b \times \sin(\theta + \beta) - \mu \times N \times a$, where a is the length from the rotational center O to the point of contact with the roller 154, b is the length from the rotational center O to the center of gravity G, $\theta$ is the opening angle of the unsealed container 160, $\beta$ is the angle formed between the line OG and the partitioning line L, Wb is the weight of the left unsealed container 160, N is the normal force (the radial supporting force) of the roller 154, $\mu$ is the coefficient of friction of the rollers 154 ($\mu = F/N = \tan\phi$, where F is the tangential power of the rollers 154), as shown in FIG. 19. Accordingly, the point of gravity of each housing member 161 is preferably located internal to the perpendicular plane containing the center point of the rollers 154 (the area defined by hatched lines in FIG. 19).

The operations of the transporting device as a whole will be explained in appropriate order with reference to FIGS. 14, FIG. 15, FIG. 16, FIGS. 17 and 18.

(1) Operation up to loading unsealed container 160 into pressure vessel 1

The platform 130 has mounted thereon the unsealed container 160 containing aged slag together with the frame members 152 on the supporting stage 172. The supporting stage 173 of the charging table 135 has mounted thereon the unsealed container 160 in empty state together with another frame members 152. Also, the transverse truck 142 has mounted thereon the lift carriage 143 and is located in opposed relation to the charging table 135.

First, steel-making slag is charged through the filling port 166 (FIGS. 15 and 18) to the unsealed container 160 from above the charging table 135 by use of supply means not shown. The bridge rails 147 of the transverse truck 142 are tilted and coupled to the rails 146 arranged on the charging table 135, whereby the lift carriage 143 is moved along the rails 146 toward the charging table 135. The lift 153 is thus extended and thereby lifts the unsealed container 160 containing slag together with the frame members 152 from the supporting stage 173. The lift carriage 143 is moved backward along the rails 146 and mounted on the second rails 141 of the transverse truck 142, so that the lift 160 is set in non-extended state, and the unsealed container 160 is mounted together with the frame members 152 on the mount 151 placed on the transverse truck 142. Subsequently, the bridge rails 147 are decoupled from the rails 146, and the transverse truck 142 is moved along the second rails 141 to the position in opposed relation to the platform 130.

The lid 2 of the pressure vessel 1 is opened and the transverse truck 142 is moved to the position in opposed relation to the pressure vessel 1. The bridge rails 147 are tilted and coupled to the rails 144. The lift 153 is extended, and after lifting the frame members 152 and the unsealed container 160 from the mount 151, the lift carriage 143 is moved along the rails 144 inside the pressure vessel 1. The lift 153 thus is set in a non-extended state, and the frame members 152 and the unsealed container 160 are mounted on the supporting stage 171. Only the lift 153 is moved backward along the rails 144 and mounted on the second rails 141 of the transverse truck 142, the bridge rails 147 are decoupled from the rails 144, and the transverse truck 142 is moved along the first rails 140 up to the position in opposed relation to the platform 130, where the lid 2 of the pressure vessel 1 is closed.

After that, the aging process is performed.

(2) Unsealed container 160 on the platform 130

The unsealed container 160 containing aged slag mounted on the supporting stage 172 of the platform 130 together with the frame members 152 is sprinkled with water therein from the sprinkler 174 provided above the platform 130.

After that, the transverse truck 142 is moved to the position in opposed relation to the platform 130, and the bridge rails 147 are tilted from the transverse truck 142 and thus coupled to the rails 145. The lift carriage 143 is moved along the rails 145 to the platform 130, and the lift 153 is extended to lift the frame members 152 and the unsealed container 160 from the supporting stage 172. The lift 153 is moved backward along the rails 145 and is mounted on the second rails 141 of the transverse truck 142, where the lift 153 is set to non-extended state thereby to mount the frame members 152 and the unsealed container 160 on the mount 151. Also, the bridge rails 147 and the rails 145 are decoupled, and the transverse truck 142 is moved along the first rails 140 up to the position above the delivery pit 136.

The bridge rails 147 are tilted again from the transverse truck 142 and thus coupled to the rails 146 of the charging table 135. With the lift 153 of the lift carriage 143 contracted, i.e., with the frame members 152 and the unsealed container 160 mounted on the mount 151, only the lift carriage 143 is moved temporarily to the charging table 135 along the rails 146. The opening portion 167 of the unsealed container 160 on the mount 151 of the transverse truck 142 is then opened to deliver slag to the delivery pit 136. At the same time as this delivery, slag being delivered is sprinkled with water from the sprinkler 170 arranged downward of the first rails above the delivery pit 136. After slag delivery, the lift carriage 143 is moved backward again along the rails 146 and mounted on the second rails 141 of the transverse truck 142.

Subsequently, the lift 153 is extended, and the frame members 152 and the unsealed container 160 are lifted from the mount 151, and the lift carriage 143 is moved along the rails 146 to the charging table 130. The lift 153 is then contracted to mount the frame members 152 and the unsealed container 160 on the supporting stage 173, after which the lift carriage 143 is moved backward again along the rails 146 and mounted on the second rails 141 of the transverse truck 142.

The bridge rails 147 and the rails 146 are decoupled from each other, and the transverse truck 142 is moved along the first rails 140 to the position opposed to the platform 130.
(3) Unsealed container after aging The lid 2 of the pressure vessel 1 is opened, and the transverse truck 142 is moved to the position opposed to the pressure vessel 1. The bridge rails 147 are coupled to the rails 144, and the lift carriage 143 is introduced into the pressure vessel 1. Using the lift 153, the unsealed container 160 is lifted together with the frame members 152, the lift carriage 143 is moved backward of the pressure vessel 1 and mounted on the second rails 141 of the transverse truck 142, the lift 153 is contracted to mount the frame members 152 and the unsealed container 160 on the mount 151, and the bridge rails 147 are decoupled from the rails 144, after which the transverse truck 142 is moved to the position opposed to the platform 130.

The bridge rails 147 are coupled to the rails 145, the lift 153 is extended to lift the frame members 152 and the unsealed container 160 from the mount 151, the lift carriage 143 is moved to the platform 130, and the lift 153 is contracted to mount the frame members 152 and the unsealed container 160 on the supporting stage 171 of the platform 130.

After that, only the lift carriage 143 is moved backward along the rails 145 and mounted on the second rails 141 of the transverse truck 142. The bridge rails 147 are decoupled from the rails 145, and the transverse truck 142 is moved along the first rails 140 to the position opposed to the charging table 135.

The operations specified in (1) to (3) are repeatedly performed.

An appropriate sprinkling process performed using at least one of the sprinklers 174 and 170 can suppress generation of dust when aged slag is delivered to the delivery pit.

The effects of the embodiment 8 constructed as described above will be described below:

(1) Slag is not directly charged into the pressure vessel, but slag accommodated in the unsealed container is charged into the pressure vessel. Therefore, the space between the container and the pressure vessel is filled with saturated steam, and the slag is heated sufficiently.

(2) Hot water generated when the vessel is heated by steam flows down while hardly making contact with slag. Slag temperature is thus not prevented from rising.

(3) Although slag is so hard as to wear others, the pressure vessel is not damaged by striking or friction since slag is accommodated in the container. When the pressure vessel is repaired, high technology conforming to regulations is required to ensure safety. However, a non-pressure vessel can be used as the container which directly makes contact with slag. The container can tolerate a certain amount of damages and can be repaired easily. Furthermore, even when spare containers having prepared at relatively low prices are replaced, the costs of the containers are low.

(4) When slag is directly charged into the pressure vessel, slag attaches to the sealing surface on the flange of the lid and may cause steam leakage and much effort may be necessary to clean the sealing surface. As a result, it may take a longer cycle time to open and close the lid. Eventually, the aging time for a single operation may be prolonged. However, these problems are not caused when slag is charged into the container.

(5) When slag is directly charged into the pressure vessel, the pressure vessel may be deformed by the swelling pressure of slag caused by aging. However, when slag is accommodated in the unsealed container, the container does not cause any problem even if it is deformed somewhat. In addition, the container can be repaired easily.

(6) When slag is swollen in the pressure vessel, slag may coagulate and cannot be discharged easily. Thereby the discharging time is prolonged, and the aging time for a single operation may also be prolonged. However, when slag accommodated in the unsealed container is loaded into and unloaded from the pressure vessel, such a problem is not caused.

(7) Since the lid is provided on a side, the lid is not in danger of being stained. Therefore a clutch door may be used for the lid.

(8) With sprinklers equipped respectively at the upper portion of a platform for temporary storing aged slag and also at the upper portion of the delivery pit for delivering slag, when either sprinkler or both sprinkle on aged slag, dust generated by discharging slag can be effectively controlled.

The above-mentioned embodiment 8 may be modified as described below. The rails 145 of the platform 30 and the rails 146 of the charging table 135 are made movable right and left by using hydraulic cylinders or the like so that unprocessed slag and processed slag can be transferred by railless free-running vehicles.

More particularly, the rails 145 are opened right and left, a railless free-running vehicle, such as a dump truck with a lifter, is moved under the container 160 charged with processed slag, the container 160 is raised from the supporting stages 172 by the lifter provided on the vehicle, the vehicle is run to a product storage area, and the slag is discharged. Next. the emptied container is charged with unprocessed slag by using a railless free-running loading machine, such as a shovel loader, and the dump truck is run to the charging table 135. The rails 146 are then opened right and left, the dump truck is moved into the charging table 135, and the lifter is lowered to place the container 160 charged with unprocessed slag onto the supporting stages 173. After this, the operations are the same as those described for the embodiment 8.

The apparatus of the embodiment 8 constructed as described above has the effects described below.

It is not necessary to construct permanent charging/ discharging means, such as belt conveyors and hoppers. Initial investment is thus minimal. Since a railless free-running vehicle is used, facilities can be laid out as desired and the layout can be changed in a highly flexible manner. In the conventional method of aging steel-making slag, slag is piled out opening portions in a wide space and left in natural conditions for about six to 12 months. Therefore, railless vehicles, such as dump trucks and shovel loaders, have been used and are usually available. In this situation, the existing equipment can be fully utilized. This is advantageous in the present embodiment.

FIG. 20 to FIG. 23 show the structure of an embodiment 9 which relates to a technology wherein steel-making slag accommodated in an unsealed container is aged in a pressure vessel having a vertically cylindrical shape.

Figure 23:
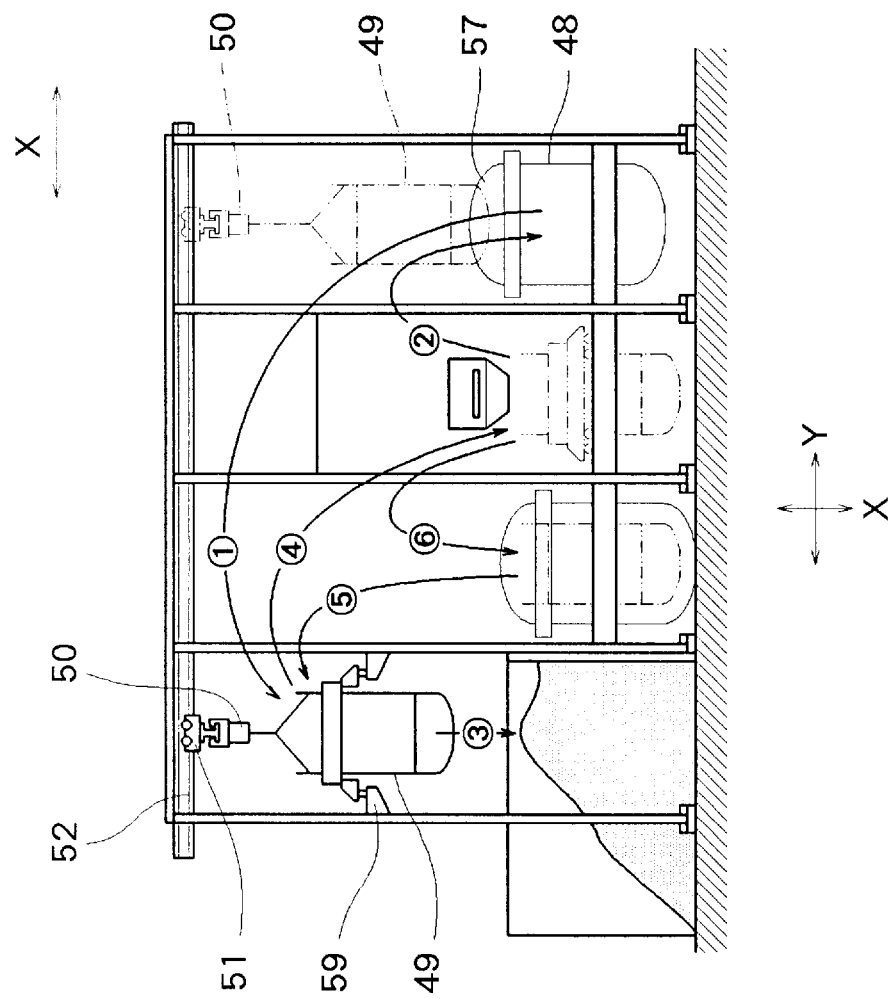
FIG. 23 is a front view illustrating the apparatus shown in FIG. 21.

Referring to these figures, numeral 48 designates a pressure vessel having a vertically cylindrical shape, numeral 49 designates an unsealed container(see FIGS. 16(*a*), (*b*)), and numeral 50 designates a hoist crane(see FIG. 23). The hoist crane 50 can freely run in the transverse direction (X direction) or in the direction (Y direction) orthogonal to the transverse direction by moving a trolley 51 along a rail 52 or a rail 53, respectively.

A method of aging steel-making slag by using the apparatus of the embodiment constructed as described above will be described below.

Steel-making slag crushed by the crusher to the extent that slag having a grain diameter of 25 mm or less constitutes 80% or more of the total amount is transferred by a transfer means 54, such as a belt conveyor(see FIG. 21), and the slag is charged into the container 49 placed on the supporting stages 56 of a charging table 55. The container 49 charged with slag is lifted by the hoist crane 50, and the trolley 51 is run along the rail 52 and the rail 53 so as to move the container 49 just above the pressure vessel 48. The hoist crane 50 is lowered, the lid 57 of the pressure vessel 48 is opened. The container 49 charged with slag is loaded into the pressure vessel 48. The hoist crane 50 is then raised, and the lid 57 is closed to seal the pressure vessel 48 (see FIG. 20(*a*) and FIG. 21).

The operations in heating and pressurizing process (2), temperature holding process (3) and pressure reducing process (4) are performed in the same manner as those performed for the embodiment 1. After those processes, the lid 57 of the pressure vessel 48 is opened and the trolley 51 is moved just above the pressure vessel 48. The container 49 charged with aged slag is lifted by the hoist crane 50. The trolley 51 is moved just above the uncharging table 58 and placed on the supporting stages 59 (see FIG. 22) provided in the uncharging table 58. Then the bottom opening device 60 (see FIG. 20(*b*)) of the container 49 is opened to discharge aged slag.

In the apparatus of this embodiment constructed as described above, in addition to the effects obtained by the embodiment 8, it is expected that the embodiment has the following effect. Since the container accommodating slag is lifted by the hoist crane, the top lid can be used for both charging and discharging. Therefore, even when a clutch door is used for the lid, there is no danger of staining the lid.

The number of the containers 49 is made larger by one than the number of the pressure vessels 48. While an unsealed container is engaged in operations of heating, pressurizing, retaining temperature and reducing pressure, another unsealed container may be in the discharging/charging steps so as to be ready for the next aging.

The above mentioned operation is performed along with the flow chart of FIG. 23 as indicated in ① to ⑥. Such operation is explained hereinafter using, for an example, an apparatus having two pressure vessels (48*a*, 48*b*) and three unsealed containers (49*a*, 49*b*, 49*c*). First, a slag aging is performed at a pressure vessel 48*a*, thereafter, one unsealed container 49*a* charged with slag aged in the pressure vessel 48 is placed on the supporting stage 59 of the uncharging table 58 so that slag is ready for discharging (See ①). During this period, another container 49*b* from which aged slag was discharged and to which unprocessed slag has been charged is loaded into a pressure vessel 48*a* which was emptied by unloading the container 49*a*, then the pressure vessel 48*a* is sealed (See ②). After the start of the heating and pressurizing process at the pressure vessel 48*a* loaded with the container 49*b*, aged slag is discharged from the container 49*a* placed on the supporting stages 59 (See ③). The container 49*a* stayed on the uncharging table 58 is moved to the charging table 55. The container 49*a* is charged with unprocessed slag by the belt conveyor 54 and stands in readiness (See ④). The heating and pressurizing process, the temperature holding process and the pressure reducing process of one pressure vessel 48*b* are finished soon. When the container 49*c* charged with aged slag is moved to the supporting stages 59 of the uncharging table 58 (See ⑤), the pressure vessel 48*b* which was emptied by unloading the container 49*c* is loaded with the container 49*a*. Subsequently the pressure vessel is sealed and the heating and pressurizing process is performed (See ③).

It is expected that the following effects can be obtained from the embodiment constructed as described above. The time required for the charging and discharging processes can be shortened. Therefore, the processing time for a single operation can be shortened. Even when slag is coagulated due to swelling and extra time is required for discharging, the processing time is hardly affected. Since sufficient time can be taken for charging slag into the container and discharging slag from the container, the capabilities (processing amounts per unit time) of the belt conveyor and the crusher can decreased.

As shown in FIGS. 24 to 26, a plurality of ventilation holes 62 are provided on the side surface 61 of a container. The inner wall of the container is provided with shelves 63 inclined downward (see FIG. 24) or cover plates 64 for covering the ventilation holes 62 (see FIG. 25). Or the free surface 66 of the slag layer determined by the angle of repose of slag is located under the ventilation hole 62 by bending the part 65 of the side surface 61 (see FIG. 26).

With this structure, steam can reach the entire slag layer. This structure is thus effective in promptly proceeding aging. Since the container is a nonpressure vessel, such ventilation holes can be provided without problems.

Figure 27:
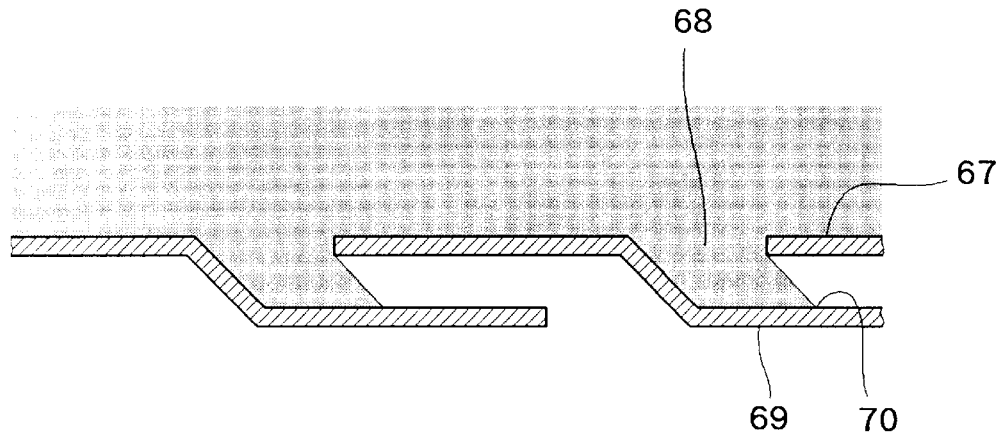
FIG. 27 is a sectional view illustrating a sealed container provided with a bottom plate under a drain hole.

In the present embodiment, as shown in FIG. 27, a plurality of drain holes 68 are provided on the bottom surface 67 of the container. A bottom plate 69 is provided under the drain hole 68 and sufficiently extended outside from the limit position 70 to which slag dropped downward from the drain hole 68 spreads sideways in accordance with the angle of repose.

This structure is effective in that hot water generated in the slag layer is discharged quickly outside the layer so that aging can proceed promptly. Since the container is a nonpressure vessel, such holes can be provided without problems.

Figure 28:
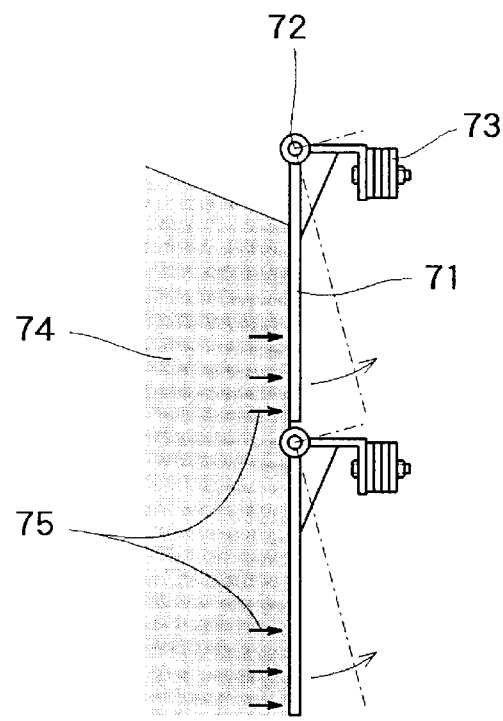
FIG. 28 is a sectional view illustrating an unsealed container, the side surface of which is deformable.

As shown in FIG. 28, the side wall 71 of the container is supported by a hinge 72. Even when the container is charged with slag 74, the side wall 71 is not pushed outward by such pressure as that caused by slag powder because of the action of a counterweight 73. However, when slag is swollen by aging and large force such as swelling pressure 75 is generated, the side wall 71 is pushed outward.

With this structure, the bucket can be prevented from being broken by the swelling of slag. Since the container is nonpressure vessel, this kind of unsealed structure is allowed without problems.

Still another embodiment of the pressure vessel is describe below referring to FIGS. 29 to 32.

Figure 29:
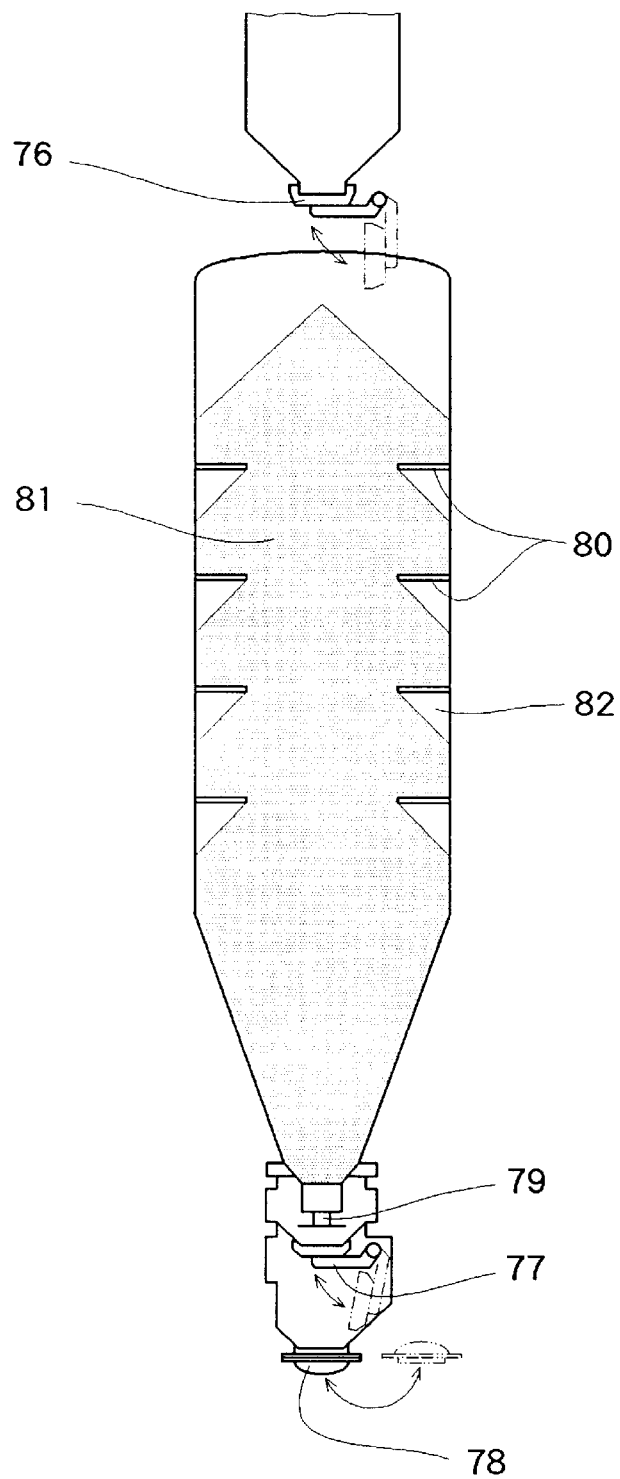
FIG. 29 is a sectional view illustrating another embodiment of a pressure vessel.

FIG. 29 shows an embodiment of the pressure vessel wherein a lid for allowing unprocessed slag to be charged and a lid for allowing processed slag to be discharged are independent of each other. Numeral 76 designates a dust valve used as a top lid which is opened when unprocessed slag is charged. A single-step dust valve is used for the top lid, since the sealing performance of the top lid is not deteriorated significantly by the adhesion of slag powder. However, since the bottom lid is deteriorated significantly by the adhesion of slag powder, a two-step dust valve comprising a drain receiving valve 77 and a gas sealing valve 78 is used for the bottom lid, and a slag cut valve 79 which is not pressure-resistant is provided above the dust valve. Therefore, since the gas sealing valve 78 can be prevented from coming into direct contact with slag or hot water mixed with slag powder, the sealing performance of the bottom lid can be improved further. Accordingly, excessive time is not necessary for cleaning and inspection at the time of opening and closing of the lid. With the pressure vessel constructed as described above, unprocessed slag can be charged and processed slag can be discharged in accordance with the procedure described below.

(1) By charging unprocessed slag after the dust valve 76 used as the top lid is opened, the lid can be prevented from being stained.

(2) When processed slag is discharged, the gas sealing valve 78 is first opened, then the drain valve 77 is opened. Although hot water flows down, since the gas sealing valve 78 has already been opened, it is not stained. In the end, the slag cut valve 79 is opened. Since the drain valve 77 and the gas sealing valve 78 have already been opened at this time, they are not stained by slag.

Furthermore, since a plurality of ribs 80 are disposed horizontally on the inner wall of the pressure vessel shown in FIG. 29, charged slag 81 forms a surface layer in accordance with the angle of repose as shown in the figure, and gaps 82 are generated under the ribs 80. Accordingly, even when slag is swollen by aging, slag rises toward the gaps, thereby releasing the swelling pressure and relieving the swelling pressure applied to the pressure vessel.

FIG. 30 shows an embodiment wherein a slag collection means is provided just ahead of the processed slag discharging lid. Referring to the figure, since the lower portion of the pressure vessel is made larger, the possibility of slag adhesion is minimized because of the following reason. The lower portion of the pressure vessel is usually made smaller, since it is difficult to obtain a large diameter dust valve. In case the lower portion is made small, when slag is swollen by aging, slag may adhere and there is a possibility of obstructing smooth discharging.

However, when a screw feeder 83 used as a collection means is provided as shown in FIG. 30, it is not necessary to make the lower portion of the pressure vessel small, and the problem of slag adhesion does not exist. Furthermore, since a primary sealing effect by using the screw feeder can be expected, a dust valve 84 having a one-step structure can be used on the discharging side.

Moreover, since a plurality of ribs 85 inclined downward are provided on the inner wall of the pressure vessel shown in FIG. 30, charged slag rarely makes contact with the inner wall of the pressure vessel. Therefore, the effect of relieving the swelling pressure applied to the pressure vessel is further greater than that obtained by the horizontal ribs shown in FIG. 29. Additionally, the ribs 85 are less obstructive than the horizontal ribs during slag discharging.

Even when the above-mentioned ribs 80 or 85 are provided on the inner wall of an unsealed container, it is expected that they are effective in relieving the swelling pressure.

Figure 31:
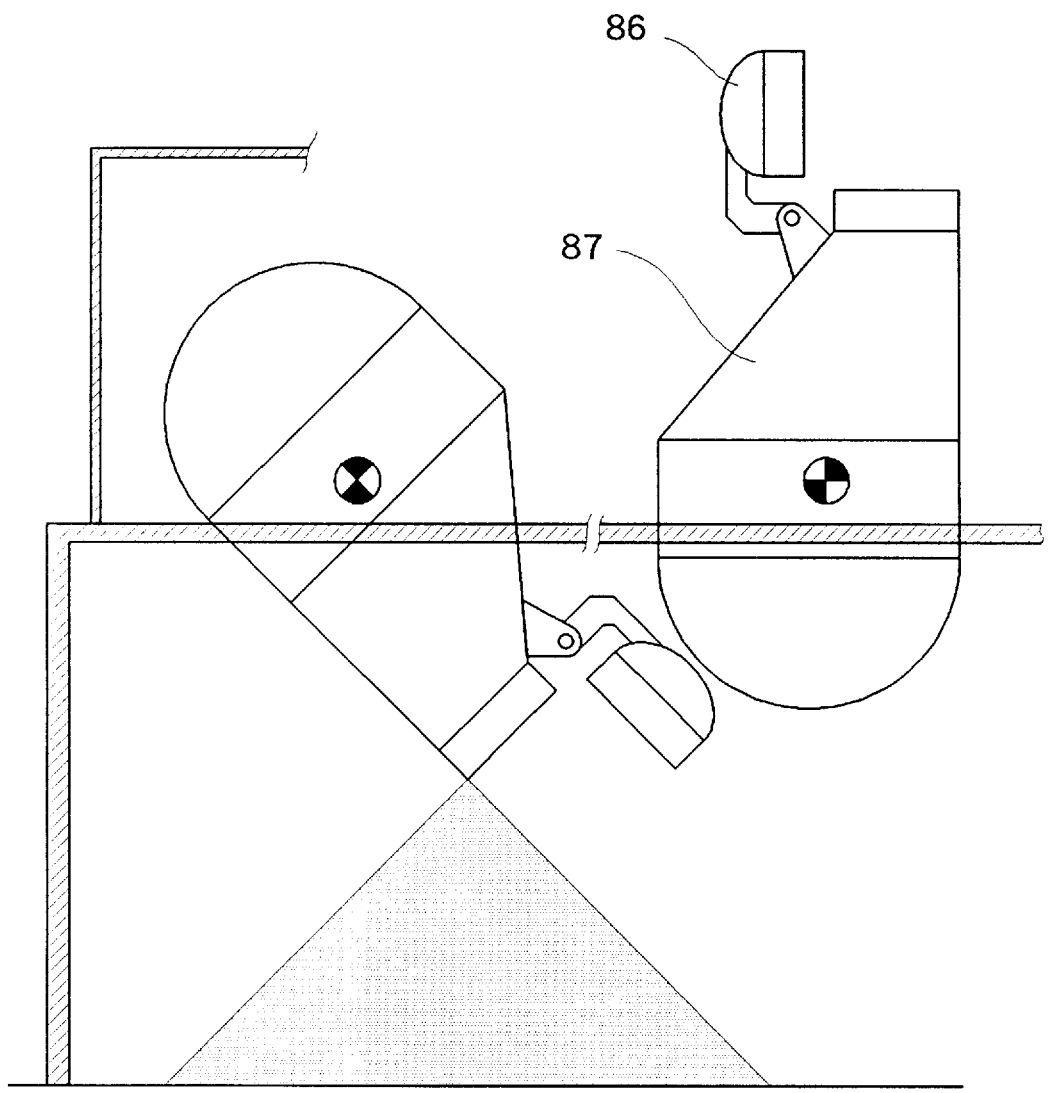
FIG. 31 is a schematic structural view illustrating still yet another embodiment of a pressure vessel.

FIG. 31 shows an embodiment wherein a single lid 86 is used to allow unprocessed slag to be charged and processed slag to be discharged. The lid 86 is a clutch door, and a pressure vessel 87 is vertically reversible. The diameter of the clutch door can be made larger than that of the dust valve. In addition, the clutch door can be opened and closed easily and securely in a short time and has high pressure sealing performance. However, stains caused by dust adhesion are not allowed for the clutch door. Therefore, it may take time to clean and inspect the clutch door, and this may cause a problem in the discharging process. To solve this problem, the pressure vessel is made vertically reversible. In the discharging process, the lid 86 is opened first when the lid 86 is positioned upward (at the position shown at right). Then the pressure vessel 87 is reversed and the lid 86 is positioned downward (at the position show at left). When processed slag is discharged in this condition, the lid 86 is prevented from being stained.

Figure 32:
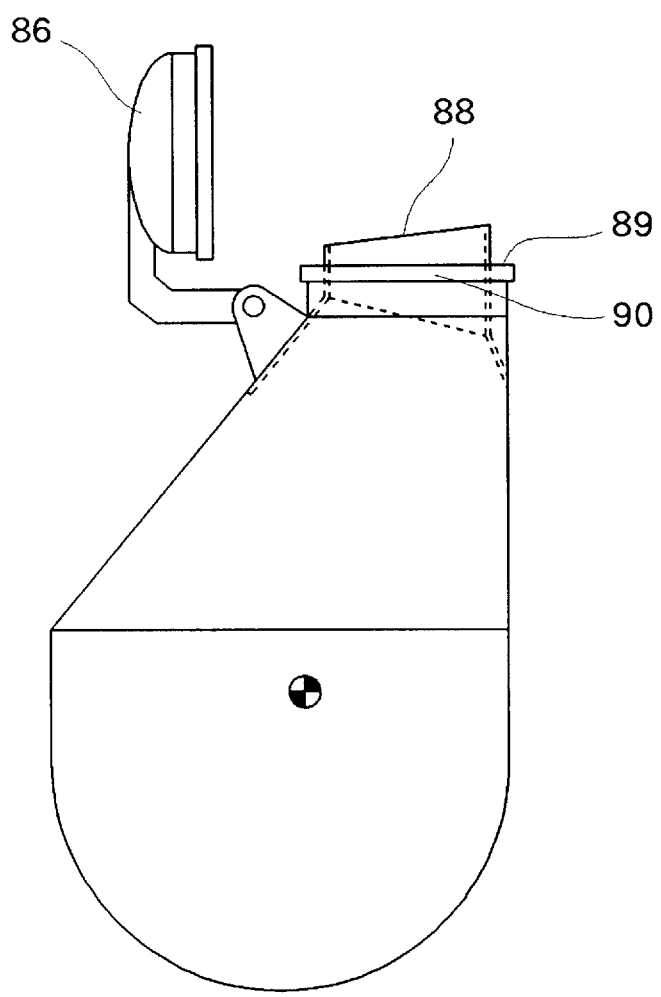
FIG. 32 is a schematic structural view illustrating further still yet another embodiment of a pressure vessel.

FIG. 32 shows an embodiment wherein a chute 88 having a smaller diameter than that of the opening of the pressure vessel is provided on the pressure vessel side of the clutch door so as to project slightly beyond the flange sealing surface 89 of the pressure vessel.

A steel-making slag aging apparatus according to the invention will be explained with reference to FIGS. 33 to 36.

Figure 33:
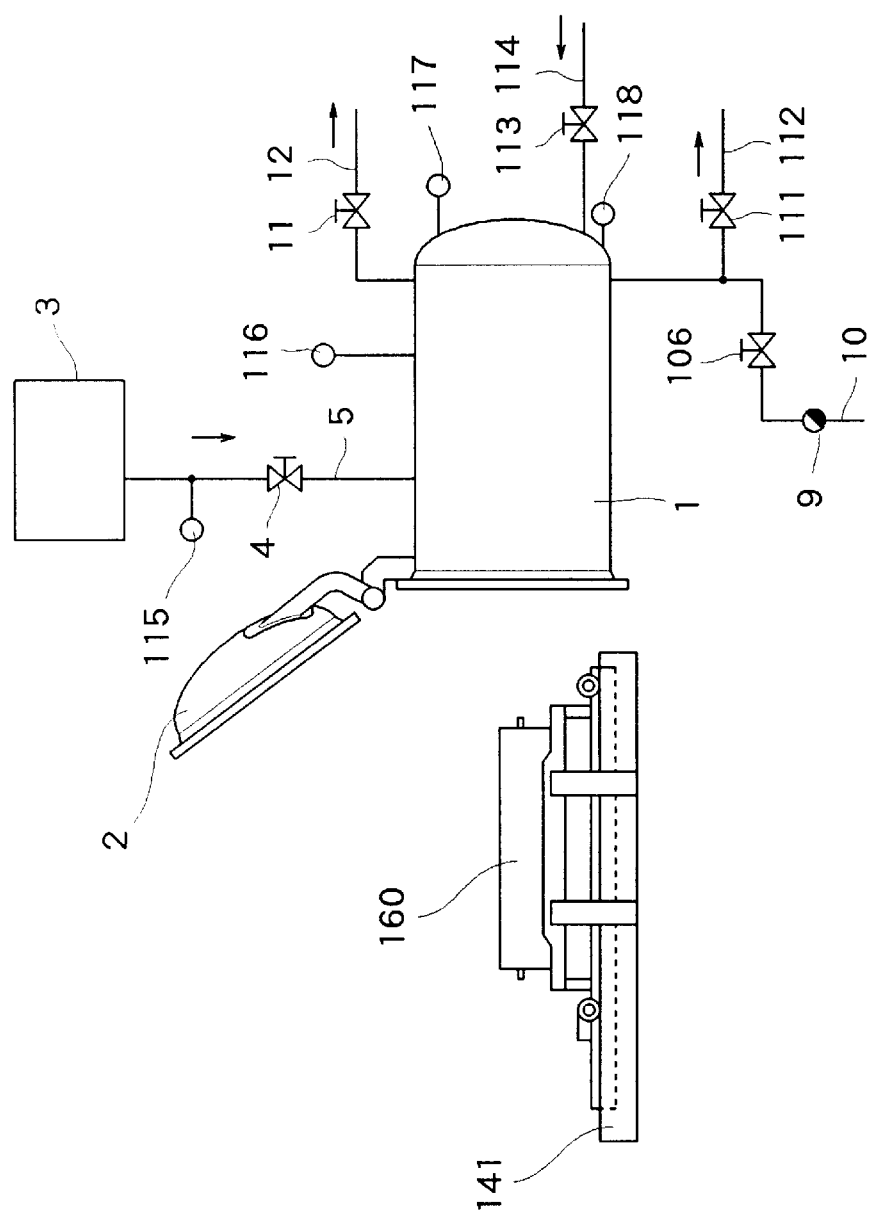
FIG. 33 is a partially (fragmentary) schematic view illustrating an embodiment of a steel-making slag aging apparatus of the present invention.

FIG. 33 is a schematic diagram showing the environment of a pressure vessel. A pressure vessel 1 is located at the central position. The pressure vessel 1 is a container adapted to be hermetically sealed in order to maintain the interior thereof in a saturated steam environment at a set pressure and set temperature. For charging and discharging, the pressure vessel 1 is provided with a lid 2. In order to measure the internal pressure and temperature of the pressure vessel 1, a pressure sensor 116 and temperature sensors 117, 118 are arranged on the pressure vessel 1. An unsealed container 60 for delivering and discharging steel-making slag is arranged at a position corresponding to the lid 2 in such manner as to be movable in the direction perpendicular to the longitudinal direction of the pressure vessel as well as along the longitudinal direction thereof, as described later. The upper portion of the pressure vessel 1 is connected, via a pipe 5 having a valve 4 and pressure gauge 115, with a steam generator 3 for supplying steam into the pressure vessel 1. On the other hand, a pipe 10 having a valve 106 and a steam trap 9 is connected under the pressure vessel 1 in order to discharge the hot water condensed from the pressurized steam in the pressure vessel 1. Further, a pipe 12 having a valve 11 for reducing the pressure from the pressure vessel 1 after complete slag aging is connected at the upper part of the pressure vessel 1.

A pipe 112 having a valve 111 for discharging the air stored in the pressure vessel 1 out of the pressure vessel 1 is arranged on the pressure vessel 1 side of the hot-water discharge pipe 10 farther from the valve 106. Further, a pipe 114 having a valve 113 for supplying water to the pressure vessel 1 is connected at the lower part of the pressure vessel 1.

The pipe 112 for air-mixed steam is preferably arranged in the neighborhood of the bottom of the pressure vessel 1 as shown in FIG. 33 so that air can be recovered in a great amount as separated from steam as far as possible. Also, the pipe 112 is preferably connected with the pipe 10 for discharging hot water within the pressure vessel 1 in order to accelerate separation between air and hot water staying in the lower part of the pressure vessel 1. Especially, separation between hot water and air is further accelerated by increasing the diameter of the pipe 112 in the vicinity of the connecting point. Providing an outlet of the pipe 112 above the water level of hot water, on the other hand, can prevent the hot water from undesirably mixing with air and being discharged by way of the outlet of the pipe 112, should hot water settle in pipe 10 for discharging hot water.

Figure 34:
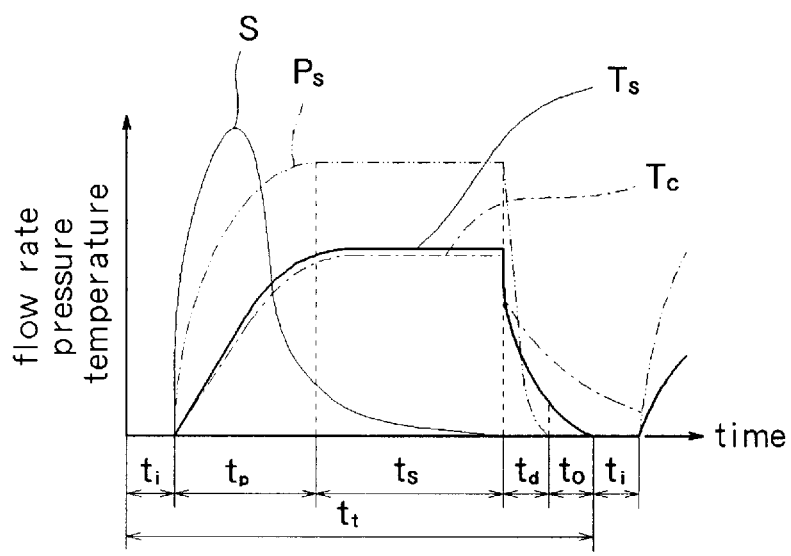
FIG. 34 is a schematic diagram illustrating changes in pressure and temperature during aging by the apparatus of the present invention.

Now, the process of aging steel-making slag using these devices according to the invention is described in detail with reference to the graph of FIG. 34 showing a temperature and pressure change.

(1) Charging process (required time $t_i$)

This operation is performed in the same manner as according to the first embodiment.

(2) Heating and pressurizing process (required time $t_p$)

This operation is performed in the same manner as according to the first embodiment.

With the progress of temperature and pressure rising in the pressure vessel 1, however, air-mixed steam are stored in the lower part of the pressure vessel 1. Therefore, air-mixed steam are appropriately discharged out of the pressure vessel through the pipe 112 by opening the valve 111 under the conditions described later. Consequently, the pressurized steam flows down to the lower part of the pressure vessel 1.

(3) Temperature holding process (required time $t_s$)

This operation is performed in the same manner as according to the first embodiment.

In the temperature holding process also, when air-mixed steam are stored in the lower part of the pressure vessel 1, the air-mixed steam is discharged out of the pressure vessel 1 through the pipe 112 by opening the valve 111 under the conditions described later.

(4) Pressure reducing process (required time $t_d$)

This operation is performed in the same manner as according to the first embodiment.

(5) Discharging process (required time $t_o$)

This operation is performed in the same manner as according to the first embodiment.

Finally, slag in the pressure vessel is discharged from it by opening the lid 2 of the pressure vessel 1. This further reduces the average temperature Tc of the slag and the pressure vessel 1 and the condensing temperature Ts of steam.

Aging is completed through the above-mentioned process. After that, the lid 2 and the valve 9 of the pressure vessel 1 are closed, and the valve 4 is opened to supply steam from the steam generator 3. The next aging process can be performed by repeating steps (1) to (5).

The discharging operation of air-mixed steam in (2) heating and pressurizing process and in (3) temperature holding process is controlled according to time, temperature and pressure as follows.

First, in a method for control according to time, the air-mixed steam is preferably discharged for 5 to 60 minutes. A period of about 10 to 30 minutes is especially preferable. The duration is set based on experiences. In the case where pressurized steam of 5 kg/cm$^2$G is supplied to 50 tons of slag and the air-mixed steam is discharged when the internal pressure of the pressure vessel 1 reaches 1 kg/cm$^2$G, for example, the temperature at the upper part of the pressure vessel 1 coincides with that at the lower part thereof within 5 to 10 minutes after the starting time point. With this as a measure, the duration can be set appropriately within said time limitation.

As for a pressure control, the preferable starting point of releasing air-mixed steam within the pressured vessel is the time when the interior pressure becomes 1 kg/cm$^2$G. This is by reason of the fact that when the internal pressure of the pressure vessel 1 is lower than 1 kg/cm$^2$G, effects caused by discharging air-mixed steam out of the pressure vessel 1 cannot be expected. Also, in view of the need to keep the valve 111 open for a long time, even the pressurized steam required to be maintained in the pressure vessel would be lost. Also, preferably, the releasing is continued until the pressure within the pressured vessel becomes more than 50% and less than 95% of the desirable predetermined pressure of the pressured steam to be supplied into the pressured vessel. In the case where the difference between the internal pressure of the pressure vessel 1 and the atmospheric pressure is excessively large, a noise is generated and even the required pressurized steam is vigorously discharged off undesirably at the time of discharge of air-mixed steam.

Further, as for a temperature control, the preferable starting point of releasing said air-mixed steam is at the time when the difference between a temperature of the air-mixed steam and a saturate temperature of steam at the internal pressure of the pressured vessel becomes more than 5° C. This temperature difference is one between the temperature of pressurized steam at the upper part of the pressure vessel and the temperature of air-mixed steam stored in the lower part of the pressure vessel 1, and can be measured with the temperature sensors 118 and 117 mounted on the exterior of the pressure vessel 1 as shown in FIG. 33. Air-mixed steam desirably continue to be discharged until the difference between the temperature of the air-mixed steam and the saturation temperature of the steam at the internal pressure of the pressure vessel is reduced to less than 5° C. causing no problem for the heating and pressurizing process and temperature holding process in the pressure vessel 1.

Figure 35:
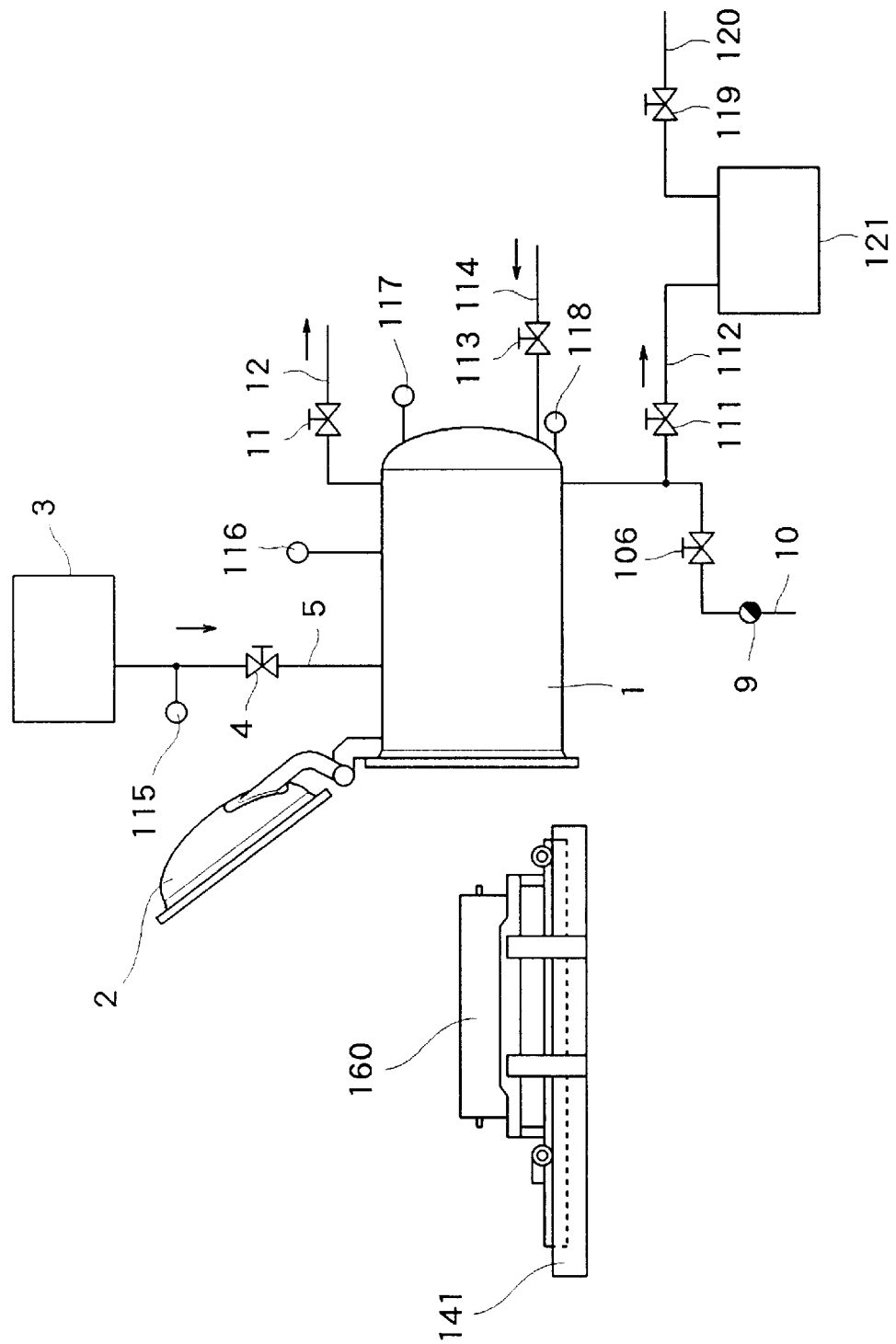
FIG. 35 is a partially (fragmentary) schematic view illustrating an embodiment of a steel-making slag aging apparatus of the present invention equipped with a storage tank.

In discharging air-mixed steam out of the pressure vessel 1, as shown in FIG. 35, it is also possible to connect a storage tank 121 to the pressure vessel through the pipe 112 to store air-mixed steam temporarily in the storage tank 121. Due to the provision of this storage tank 121 communicating with the pressure vessel 1, the increase in the internal pressure of the pressure vessel 1 also increases the internal pressure of the storage tank 121. Thereby air-mixed steam is stored in the storage tank, and at the same time, steam required by the pressure vessel 1 is not discharged outside, and therefore the aging time is not extended. Also, since the pipe 120 having the valve 119 of the storage tank 121 is open to the atmosphere, air-mixed steam can thus be discharged outside after completion of aging.

Further, at the time of discharging hot water in processes of (2) heating and pressurizing and (3) temperature holding, it is useful to supply cooling water to dilute the hot water from pipe 114 having the valve 113, as shown in FIGS. 33 to 35 appropriately. More particularly calcium hydroxide dissolved in hot water is lower in solubility and becomes more difficult to dissolve in hot water, the higher the temperature of hot water of the solvent. By cooling the hot water, calcium hydroxide dissolved in hot water is thus prevented form being deposited in crystal form in the vicinity of the pipe 10 and causing calcium hydroxide to be dissolved in water a greater amount.

Figure 36:
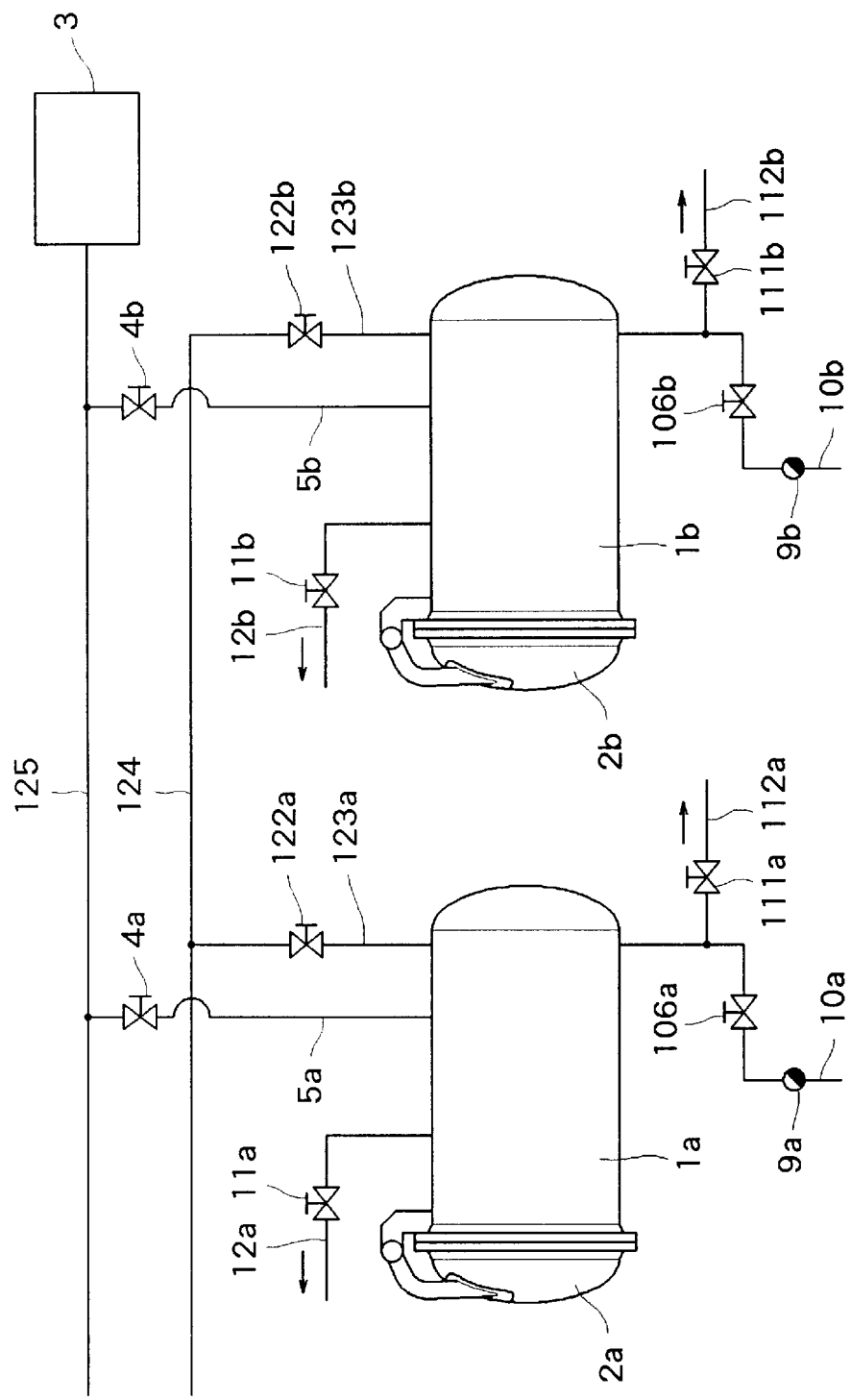
FIG. 36 is a partially (fragmentary) schematic view illustrating an embodiment of a steel-making slag aging apparatus of the present invention equipped with a plurality of a pressure vessel.

At the time of executing the (4) pressure reducing process, part of steam discharged from the pressure vessel in the first aging operation is supplied to the pressure vessel next to be in aging operation, thereby saving part of the pressurized steam supplied to the pressure vessel in the next step. As shown in FIG. 36, therefore, a plurality of pressure vessels 1 shown in FIGS. 33 and 35 may be connected so as to communicate each other and can be used selectively for aging.

In the case under consideration, a plurality of pressure vessels 1 (1a, 1b) are arranged in juxtaposition, and the same members as those in FIG. 33 are assigned as the reference numerals respectively. The following description will be made by attaching (a) to the reference numerals of the pressure vessel first to be aged and the peripheral members thereof and (b) to the reference numerals of the pressure vessel next to be aged and the peripheral members thereof.

FIG. 36 is different from FIG. 33 in that pipes 5a, 5b having valves 4a, 4b of the pressure vessels 1a, 1b are connected to the steam generator and the pipe 125 respectively in order to supply steam to the pressure vessels 1 from the steam generator 3. In order to supply pressurized steam discharged from the pressure vessel 1a, after complete aging, to the other pressure vessel 1b, the respective pressure vessel 1a, 1b are connected with pipes 123a, 123b having valves 122a, 122b, which pipes 123a, 123b are in turn connected to each other by a common 1 pipe 124.

A method of aging using the apparatus shown in FIG. 36 is described below.

First, the pressure vessel 1a to be first aged follows the same procedure as in (1) changing process to (3) temperature holding process and in (5) discharging process. In process of (4') pressure reducing, however, the valve 122a of the pressure vessel 1a and the valve 122b of the pressure vessel 1b next to be aged are opened, so that steam remaining in the first pressure vessel 1a is supplied to the next pressure vessel 1b through the common pipe 124. The pressure vessel 1b is assumed to have already completed the process of (1) charging. After the internal pressures of the pressure vessels 1a and 1b become uniform and steam steps to flow, the valves 122a and 122b are closed while the valve 11a for the pressure vessel 1a opened thereby to discharge the remaining steam through the pipe 12a and reduce the internal pressure of the pressure vessel 1a to the atmospheric level, after which (5) discharging process can be effected.

Next, the pressure vessel 1b supplied with steam from the pressure vessel 1a after completion of (1) charging process, in (2') heating and pressurizing process, is then supplied with steam until the interior of the pressure vessel 1b is reached a predetermined saturated steam environment, through the steam generator pipe 23 and the pipe 5b from the steam generator 3 by opening the valve 4b. In the process, hot water is discharged through the pipe 1ob, and water is supplied from a pipe not shown in the figure to dilute and cool the hot water appropriately. On the other hand, the air-mixed steam are discharged appropriately through the pipe 112b, after which (2) temperature holding process, (4) pressure reducing process and (5) discharging process are effected to complete the aging process.

More specifically, the steps of (1), (2'), (3), (4') and (5) are repeated.

In this aging method, the air intruded in the pressure vessel when steel-making slag is charged in the pressure vessel, and the air-mixed steam of which the water contents condensed into hot water are separated from the pressurized steam supplied into the pressure vessel in the heating and pressurizing process for aging, are prevented from being stored in the lower part of the pressure vessel.

As a consequence, the pressurized steam supplied to the pressure vessel accelerates the temperature and pressure raising of all the parts including the lower part of the pressure vessel within a short period of time, thereby saving the loss of steel-making slag aging time. Specific effects are obtained as follows.

The air-mixed steam are discharged out of the pressure vessel appropriately under the temporal, temperature and pressure conditions through the pipe mounted in the neighborhood of the bottom of the pressure vessel. Therefore, the pressurized steam required for the interior of the pressure vessel is prevented from being discharged out of the pressure vessel, and the heating and pressurizing process in the pressure vessel can be accomplished within a short period of time.

The air-mixed steam can also be stored in a storage tank without discharging the air-mixed steam directly out of the pressure vessel. In such a case, since the pressure vessel and the storage tank communicate with each other, the internal pressure of the storage tank increases with the internal pressure of the pressure vessel. The air-mixed steam are thus stored, and the steam required for the storage tank is not discharged, thereby preventing the aging time from being extended.

Assume that the air-mixed steam discharged as described previously is applied to a method in which the aging is effected selectively using a plurality of pressure vessels. In such a method, part of the steam discharged from a pressure vessel that first performed the aging process is supplied to a second pressure vessel for performing the aging in order to share in the pressurized steam supplied to the second pressure vessel. Then, the air-mixed steam stored in a plurality of pressure vessels can be discharged appropriately out of the pressure vessels. The air-mixed steam in one pressure vessel is thus prevented from being supplied to another pressure vessel, and it becomes possible to supply only the required pressurized steam.

Also, assume that the cooling water is appropriately supplied through a pipe at the lower part of the pressure vessel to dilute and cool hot water during the heating and pressurizing process and the temperature holding process. The calcium hydroxide, which is hard to dissolve in high-temperature hot water providing as a solvent, is cooled and therefore is dissolved in a greater amount. Also, diluted hot water prevents the calcium hydroxide dissolved in hot water from being crystallized in the hot water discharge pipe and thereby adversely affecting the pipe functions.

The duration required for aging is classified into $t_i$, $t_p$, $t_s$, $t_d$ and $t_o$ as described above. Especially, the time $t$, required for (1) charging process and the time $t_p$ required for (2) heating and pressurizing process, as shown in FIG. 2, can be determined once the internal pressure $P_s$ of the pressure vessel and the condensing temperature $T_s$ of steam are measured by a pressure sensor, a temperature sensor or the like from outside. Also, the time $t_d$, $t_o$ required for (4) pressure reducing process and (5) discharging process, respectively, can be easily determined based on the internal volume of the pressure vessel and slag charge.

In the most critical process of (3) temperature holding process for accelerating the hydration reaction in the aging process, however, the pressure and temperature in the pressure vessel are kept constant, and therefore the time required for the temperature holding, i.e., the time $t_s$ required for hydration reaction can not be estimated from the pressure or temperature changes.

In view of this, the time $t_s$ required for the temperature holding process is conventionally set by adjusting the amount of slag charged in the pressure vessel 31 to a predetermined range, setting a steam pressure suitable for the charge, the unslaked lime (free lime) content of slag and the water-soaked expansion ratio, and incorporating them with a safety factor based on experiences.

In the case where the time $t_s$ required for the temperature holding process is insufficient, hydration reaction of steel-making slag cannot be completed nor a uniform grain size of steel-making slag can be obtained, resulting in an insufficiently aged steel-making slag. In the case where the time of temperature holding process is unnecessarily long, on the other hand, hydration reaction is finished more than completely. Therefore, the aged product is free of problems and a satisfactory aggregate for road material can be obtained, only at the expense of wasteful consumption of operation time.

Under the above circumstances of the conventional steel-making slag aging method, it is indispensable to set a time allowing for an extraneous time added to the minimum time required for compete hydration in the temperature holding process although it is the expense of wasteful consumption of operation time.

In order to solve the above mentioned problem, the inventors of the present invention have made a research and development on the subject matter and found out a preferable method for saving even such wasteful consumption of operation time. The method thereof is shown in the following embodiment.

According to this embodiment, there is provided an aging method free of wasteful operation time.

In the (3) temperature holding process, a high-temperature saturated steam pressurized for accelerating the hydration reaction of free lime yet to be hydrated is supplied while keeping the temperature and pressure constant in the pressure vessel 1. The steam flow rate Q from the steam generator 33, therefore, decreases progressively with the progress of hydration reaction of the free lime contained in slag.

Figure 39:
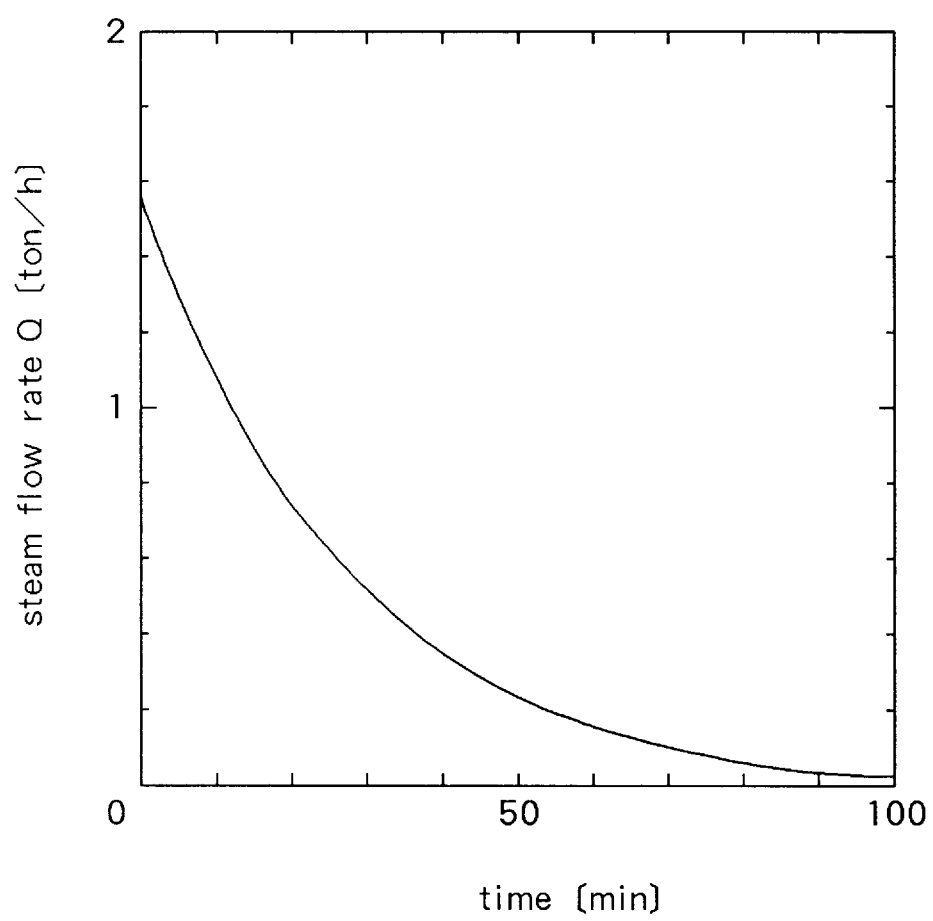
FIG. 39 is an enlarged partially (fragmentary) view showing a curve of steam flow rate Q of FIG. 38.

Actual change of the temperature holding process is shown in FIG. 39. In FIG. 39 which is a view enlarged from FIG. 2, the ordinate represents the steam flow rate Q (ton/h) and the abscissa the change in time t (minutes) required for temperature holding. The steam flow rate Q is seen to be plotted as an attenuation curve in a certain relation to the time axis.

According to the embodiment under consideration, considering the attenuation of the steam flow rate Q unique in the temperature holding process, the change of steam flow rate Q with time t is determined before complete hydration reaction, and the time point when the steam flow rate Q becomes zero or the time point when a change disappears for a predetermined length of time, is calculated by the arithmetic operation. The time required for temperature holding process thus is determined, thereby eliminating the wasteful operation. In other words, there is provided an aging method comprising the steps of charging normal-temperature steel-making slag crushed to a predetermined grain size, in a sealable pressure vessel and supplying high-temperature, high-pressure saturated steam to the pressure vessel, thereby maintaining the interior of the pressure vessel in a pressurized high-temperature steam environment and accelerating hydration reaction of steel-making slag in the same environment, characterized in that the time point of complete hydration reaction is determined by performing the arithmetic operation on a flow rate change curve representing the attenuation of the flow rate of the pressurized high-temperature saturated steam supplied to the pressure vessel, thereby determining an optimum time of hydration reaction.

This embodiment has been developed considering the change in steam flow rate Q in the temperature holding process, or more specifically, the temporal change of the attenuation curve representing the steam flow rate Q in the temperature holding process.

In other words, the steam flow rate Q in the temperature holding process is expressed by equation 1 below.

$$Q = a \times (dQ/dt) + b \qquad \text{Equation 1}$$

which is rewritten as $$1/(Q-b) \times dQ = (1/a) \times dt \qquad \text{Equation 2}$$

Integrating both sides leads to $$\log(Q-b) = (1/a) \times t + c \qquad \text{Equation 3}$$

This is rewritten into $$Q - b = e^{\{(1/a)t+c\}} \qquad \text{Equation 4}$$

Substitution A for 1/a, B for c and C for b leads to $$Q = e^{(At+B)} + C \qquad \text{Equation 5}$$

Rewriting this equation into an equation for determining t $$t = a \times (\log(Q-b) - c) \qquad \text{Equation 6}$$

This equation is rewritten as $$t = a \times \log(Q-b) - a \times c \qquad \text{Equation 7}$$

Substituting A for 1/a, B for c and C for b leads to $$t = (1/A) \times (\log(Q-C) - B) \qquad \text{Equation 8}$$

The time point $t=t_1$ when the inside of the pressure vessel reaches the saturated steam environment set by the pressurized high-temperature steam supplied from the steam generator is reached and the time point $t=t_2$ when hydration reaction is completed are determined by using t, wherefrom the time $t_s$ ($=t_2-t_1$) required for temperature holding can be derived.

In other words, the method of aging steel-making slag according to the embodiment under consideration is characterized in that the steam flow rate is assumed to be Q (ton/h), the change curve representing the attenuation of the steam flow rate Q is given by an equation Q=exp (At+B)+C (A, B, C: constant), the steam flow rate undergoing a change every moment is sampled for a predetermined length of time from the time point ($t=t_1$) when the pressure vessel reaches a steam environment at a predetermined pressure and temperature, a part of the change curve is determined from the sampled value, the sampled value thus obtained is substituted into the change-curve formula Q=exp (At+B)+C thereby to determine the constants A, B and C and estimate the whole change curve, the time point ($t=t_2$) (minutes) when hydration reaction is completed is determined, and $t_1$ is subtracted from $t_2$ thereby to obtain the optimum time for hydration reaction.

A specific method of aging steel-making slag according to this embodiment will be explained in more detail with reference to FIGS. 37 to 40.

Figure 37:
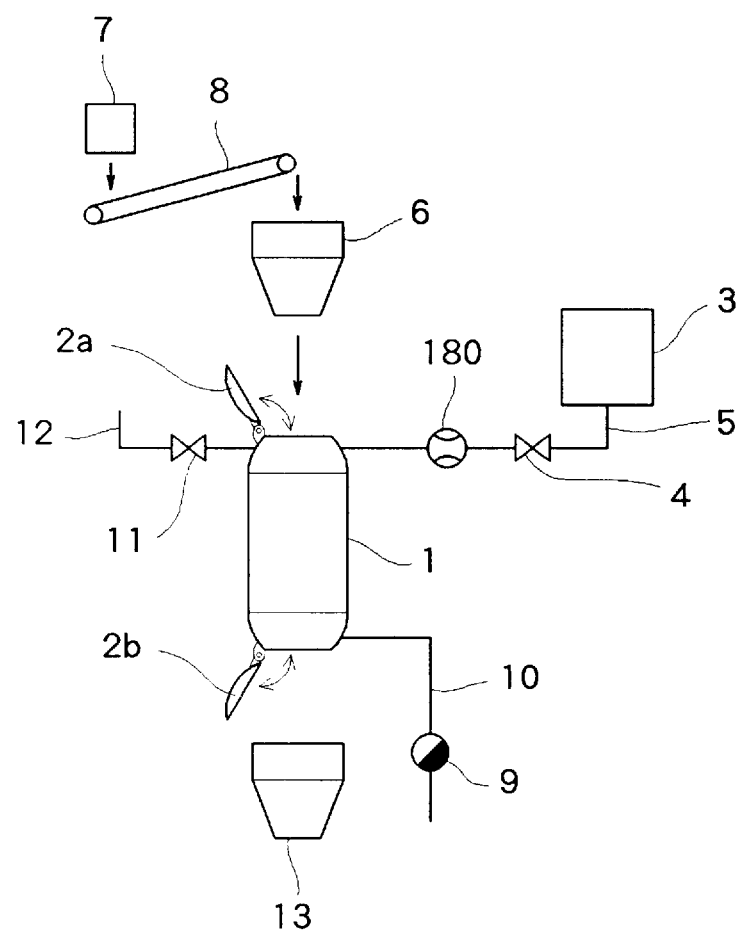
FIG. 37 is an overall structural view illustrating an embodiment of a steel-making slag aging apparatus of the present invention.

FIG. 37 shows an example of an apparatus for aging steel-making slag applied to an aging method according to the invention. Basically, the embodiment has a similar configuration to the embodiment 1 and has the same component members designated by the same reference numerals respectively as in the embodiment 1. In order to measure the pressure and temperature in the pressure vessel 1, a temperature sensor and a pressure sensor (not shown) are arranged on the exterior of the pressure vessel 1. Also, in order to measure the flow rate of steam supplied from the steam generator 3 to the pressure vessel 1, a flowmeter 180 is arranged on the pressure vessel 1 side of the pipe 5 farther from the valve 4. The measurements of steam flow rate are electrically connected to an input processor and an arithmetic unit not shown in which the measurements are arithmetically processed.

Figure 38:
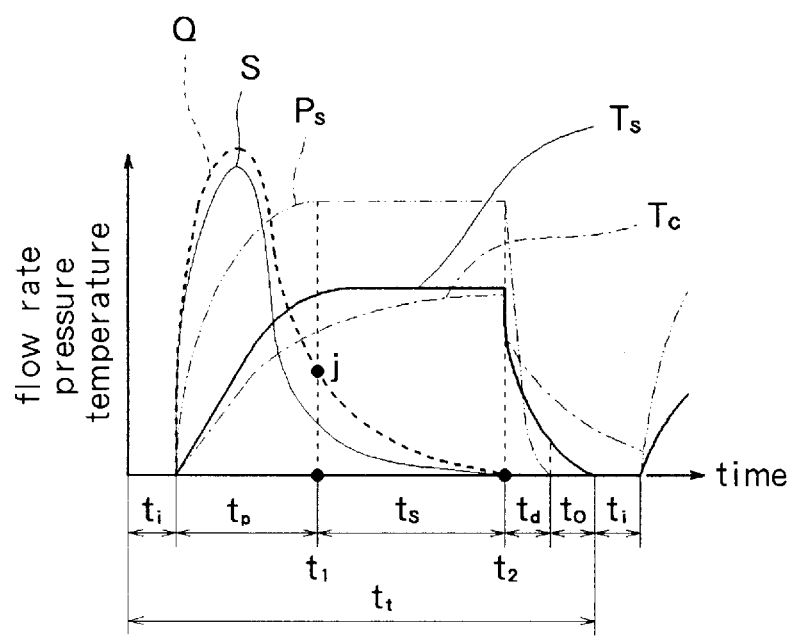
FIG. 38 is a schematic diagram illustrating changes in pressure, temperature and steam flow rate Q during aging by the apparatus of the present invention.

First, the whole process of aging by the aging method using the apparatus according to the embodiment will be explained with reference to a graph of FIG. 38 showing temperature and pressure changes.

(1) Charging process (required time $t_i$)

This operation is carried out in a manner identical to those performed in the embodiment 1.

(2) Heating and pressurizing process (required time $t_p$)

This operation is carried out in a manner identical to those performed in the embodiment 1.

(3) Temperature holding process (required time $t_s$)

The pressure of the pressurized high-temperature saturated steam supplied from the steam generator 3 is constant. With the increase in the internal pressure $P_s$ of the pressure vessel 1, therefore, the flow rate Q of steam supplied from the steam generator 3 decreases, which in turns decreases the amount S of hot water generated due to phase transition.

In spite of the decrease in the steam flow rate Q and the amount S of hot water generated, steam continues to be supplied. Therefore, the internal pressure $P_s$ of the pressure vessel 1 further increases until a saturated steam environment is reached at a pressure substantially equal to that of the steam supplied from the steam generator 3. Under this condition, in order to maintain a constant temperature and a constant pressure, steam continues to be supplied and hot water continue to be discharged during a period of time $t_s$ determined by the method of determining the aging time described later thereby to accelerate hydration reaction of unslaked lime.

Hydration reaction is a reaction expressed as $CaO + H_2O \rightarrow Ca(OH)_2$. With the progress of hydration reaction, the steam flow rate Q further decreases.

(4) Pressure-reducing process (required time $t_d$)

This operation is carried out in a manner identical to the first embodiment 1.

(5) Discharging process (required time $t_o$)

This operation is carried out in a manner identical to the embodiment 1.

The aging process is completed through these processes. Subsequently, the bottom lid 2b and the valve 11 of the pressure vessel 1 are closed and processes (1) to (5) are repeated to perform the next aging operation.

Figure 40:
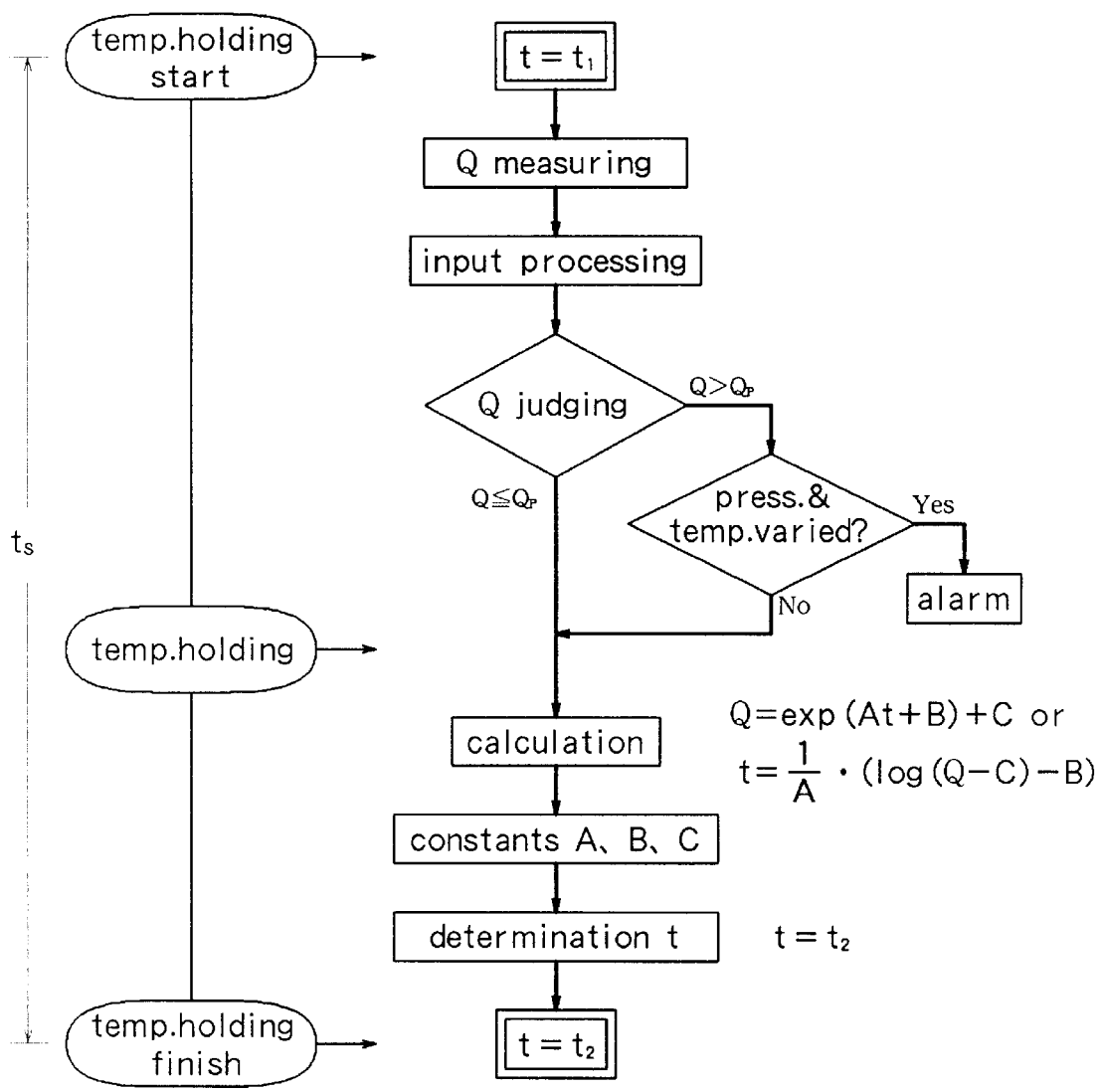
FIG. 40 is a flow chart illustrating an operation to be used in the subject invention.

Now, the arithmetic operation for an aging method according to the embodiment under consideration will be described with reference to FIGS. 38 and 40. FIG. 40 is a general flowchart in which the steam flow rate Q supplied to the pressure vessel is used as a factor for determining the time $t_s$ required for the temperature holding process.

First, the temperature and pressure changes in the pressure vessel 1 are measured by the temperature sensor and the pressure gauge arranged in the pressure vessel 1. A time point is determined when after completion of (2) heating and pressurizing process the pressure $P_s$ of a saturate steam environment in the vessel reaches substantially equal to the pressure of the steam supplied from the steam generator, i.e., a time point when the steam flow rate Q reaches point j in FIG. 38. This time point is assumed to be $t=t_1$ (FIG. 38).

Next, according to the flowchart of FIG. 40, the time $t_s$ required for the temperature holding process is calculated through the following two general substeps.

(1) Data accumulation substep

With the time point $t=t_1$ as a starting time of the temperature holding process, the steam flow rate Q supplied from the steam generator 3 to the pressure vessel 1 is measured continually or at regular time intervals by the flowmeter 14 installed in the pipe 5.

Then, after confirming by the input signal(measurement) that the steam flow rate Q measured has entered the area of the attenuation curve, data variations due to the flowmeter characteristics, etc., are provisionally processed by the input processor. A preferable method of input processing is a method of moving averages, for example, in which data on the electrical flow rate signal are accumulated by being displaced temporally to compute the average value at regular intervals of time, thus performing input processing. Other methods, include one in which input data are accumulated and divided by the number of input data and one in which the least square method is used for each predetermined sample amount accumulated by time lag.

The data of steam flow rate Q processed by the input processor is compared with the past data Qp (data due to the past attenuation curve) as shown in FIG. 39.

In the case where the steam flow rate Q is the same as or smaller than the past data Qp, i.e., in the case where $Q \leq Qp$, the temperature holding process is continued and the arithmetic operation described later is performed.

In the case where the steam flow rate Q is larger than data Qp, i.e., in the case where $Q > Qp$, by contrast, the pressure and temperature in the pressure vessel 1 are checked to see whether they are constant or not. When they are constant, the temperature holding process is continued, and as when the steam flow rate $Q \leq Qp$, the arithmetic operation described later is performed. In the event that the temperature and pressure in the pressure vessel 1 are varied, however, it indicates that a state suitable for the temperature holding process is not secured. Therefore, an alarm is issued prompting a check of the operating conditions.

(2) Arithmetic operation

A part of the attenuation curve of steam flow rate Q is determined from the date on steam flow rate Q obtained in the substep (1) above, and data relating to Q and t at a plurality of points on this curve are substituted into equation 5 or 8 thereby to determine constants A, B and C. Then, the time point $t=t_2$ when the temperature holding process completes its calculated from the equation for the attenuation curve determined in its entirety.

A starting point $t=t_1$ is subtracted from the calculated time $t=t_2$ of completion of the temperature holding process, and thus the time $t_s$ required for hydration reaction is obtained.

Hydration reaction of the unslaked lime contained in slag is completed by continuing the temperature holding process for the length of time $t_s$.

The constants A, B, and C are set by sequential computations according to the conditions of hydration for each batch. When determining the aging time using equation 5, therefore, there is no need to take into consideration various slag conditions including slag charge amount, content of free lime, steam pressure supplied and water-soaked expansion ratio of slag.

Description will be made about the time required for the temperature holding process in the case where the aging apparatus and the aging method described above are actually used.

EXPERIMENT 1

Figure 41:
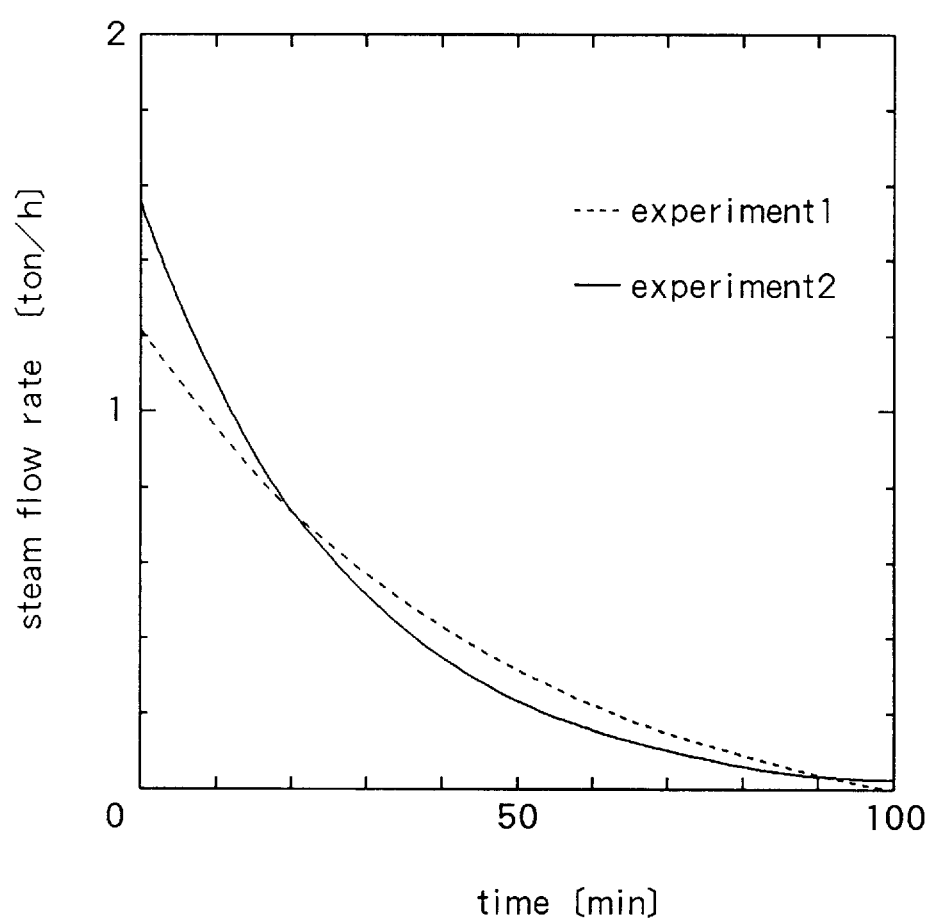
FIG. 41 is a schematic diagram illustrating changes in steam flow rate Q during a temperature holding process of embodiments of the apparatus of the present invention.

Charging 50 tons of slag with 4% water-soaked expansion ratio containing 3% free lime, the aging process was performed under $P_s=4$ kg.cm²G, and the time required for the temperature holding process was set by carrying out the arithmetic operation on an attenuation curve of the steam flow rate Q shown in FIG. 41 according to the aging method of the embodiment under consideration.

As a result, the aging condition was found satisfactory with the required time of 100 minutes (t).

EXPERIMENT 2

Charging 50 tons of slag with 6% water-soaked expansion ratio containing 5.5% free lime, the aging process was carried out under the condition of $P_s=4$ kg/cm²G, and the time required for the temperature holding process was set by performing an arithmetic operation on attenuation curve for the steam flow rate Q shown in FIG. 41 by the aging method according to the invention.

As a result, the required time of 115 minutes (ts) was obtained with satisfactory aging conditions and slag grain size.

COMPARISON 1

The aging process was conducted with on 50 tons of slag with 4% water-soaked expansion ratio containing 3% free lime under the condition $P_s=4$ kg/cm²G. The time required for the temperature holding process allowing for safety was 120 minutes, resulting in a satisfactory aged condition of slag.

COMPARISON 2

The aging process was carried out on 50 tons of slag with 6% soaked-water expansion ratio containing 5.5% free lime under $P_s=4$ kg/cm²G. The time required for the temperature holding process allowing of safety was 150 minutes, and a satisfactory aged condition of slag was obtained.

The results of two experiments relating to the invention and two comparisons are presented in the table shown in FIG. 42.

As seen from FIG. 42, a calculation of the time required for the temperature holding process using the aging method according to the invention shows that the time required for the temperature holding process is reduced by the estimated time of temperature holding, i.e., by 20 minutes according to experiment 1 and by 35 minutes according to experiment 2 as compared with the comparisons. In addition, the conditions after aging are so satisfactory that slag with uniform grain size could be obtained in both experiments 1 and 2.

The method of aging steel-making slag according to the experiments are capable of reducing the time required for the temperature holding process and hence the overall aging time $t_r$.

Also, in the method of arithmetic operation according to the invention, the constants A, B and C are determined from an equation representing the relation between the steam flow rate Q and the time $t_s$ required for the temperature holding process by reference to an attenuation curve of the steam flow rate Q. Therefore, the time $t_s$ required for the temperature holding process meeting the hydration requirements of caustic lime contained in slag can be obtained regardless of the amount of steel-making slag charged in the pressure vessel 1, the content of unslaked lime (free lime) in slag or the water-soaked expansion ratio of slag.

Consequently, the extraneous time required for the temperature holding process in the conventional methods can be eliminated by using the minimum time $t_s$ required for temperature process obtained according to the experiments, and thus the overall aging time and the loss of operation time can be reduced.

The foregoing detailed description has been given for clearness of understanding only, and no unnecessary limitations should be understood therefrom, as modifications will be obvious to those skilled in the art.

What is claimed is:

1. A method of aging steel-making slag containing calcium oxide comprising the steps of:
   (1) charging steel-making slag containing calcium oxide at a temperature of less than about 200° C. and crushed to the extent that slag having a grain diameter of 25 mm or less constitutes at least 80% of the total amount, into a pressure vessel;
   (2) sealing said pressure vessel and supplying pressurized steam into said vessel to heat said vessel and slag and to raise the temperature and pressure in said pressure vessel to hydrate the calcium oxide to calcium hydroxide while continuously discharging condensed hot water to prevent lowering the temperature of the surface of the slag grains and to prevent adhesion of the calcium hydroxide;
   (3) keeping the interior of said vessel in a condition of saturated steam at a pressure of about 2 to 10 kg/cm²G for about 1 to 5 hours;
   (4) reducing the pressure in said pressure vessel to atmospheric pressure; and,
   (5) discharging said steel-making slag.

2. A method of aging steel-making slag containing calcium oxide comprising the steps of:
   (1) charging steel-making slag containing calcium hydroxide at a temperature of less than about 200° C. and crushed to the extent that slag having a grain diameter of 25 mm or less constitutes at least 80% of the total amount, into a pressure vessel;
   (2) sealing said pressure vessel and supplying pressurized steam into said vessel to heat said vessel and slag and to raise the temperature and pressure in said pressure vessel and to hydrate the calcium oxide to calcium hydroxide while continuously discharging condensed hot water to prevent lowering the temperature of the surface of the slag grains and to prevent adhesion of the calcium hydroxide;
   (3) keeping the interior of said vessel in a condition of saturated steam at a pressure of about 2 to 10 kg/cm²G for about 1 to 5 hours;
   (4) discharging the steam in said pressure vessel to reduce the pressure in said pressure vessel to atmospheric pressure; and,
   (5) discharging said steel-making slag; and,
   further comprising a step of discharging an air-mixed steam stored at the bottom of the interior of the pressurized vessel out of said pressurized vessel during the step of supplying pressurized steam into said vessel to heat said vessel and slag and during the step of keeping the interior of said vessel in a condition of saturated steam.

3. A method of aging steel-making slag containing calcium oxide comprising the steps of:
   (1) charging steel-making slag containing calcium hydroxide at a temperature of less than about 200° C. and crushed to the extent that slag having a grain diameter of 25 mm or less constitutes at least 80% of the total amount, into a pressure vessel;
   (2) sealing said pressure vessel and supplying pressurized steam into said vessel to heat said vessel and slag and to raise the temperature and pressure in said pressure vessel while discharging condensed hot water;

(3) keeping the interior of said vessel in a condition of saturated steam at a pressure of about 2 to 10 kg/cm$^2$G for about 1 to 5 hours;

(4) reducing the pressure in said pressure vessel to atmospheric pressure; and, (5) discharging said steel-making slag; and, further comprising a steps of discharging from said pressure vessel a mixture of air and steam which is formed at the bottom of said vessel when pressurized steam is supplied to said vessel and conveying said mixture to a storage container.

4. A method of aging steel-making slag containing calcium oxide comprising the steps of:

(1) charging steel-making slag containing calcium oxide at a temperature of less than about 200° C. and crushed to the extent that slag having a grain diameter of 25 mm or less constitutes at least 80% of the total amount, into a pressure vessel;

(2) sealing said pressure vessel and supplying pressurized steam into said vessel to heat said vessel and slag and to raise the temperature and pressure in said pressure vessel and to hydrate the calcium oxide to calcium hydroxide while discharging condensed hot water to prevent lowering the temperature of the surface of the slag grains;

(3) keeping the interior of said vessel in a condition of saturated steam at a pressure of about 2 to 10 kg/cm$^2$G for about 1 to 5 hours;

(4) discharging the steam from said pressure vessel to reduce the pressure to atmospheric pressure;

(5) discharging said steel-making slag;

(6) charging steel-making slag containing calcium oxide at a temperature of less than about 200° C. and crushed to the extent that slag having a grain diameter of 25 mm or less constitutes at least 80% of the total amount, into said pressure vessel;

(7) sealing said pressure vessel;

(8) supplying hot condensed water which was previously discharged from said pressure vessel in step (2) to said pressure vessel to preheat said vessel and said slag and then discharging said water;

(9) supplying pressurized steam into said pressure vessel containing said slag which was charged into said vessel in step (6) to heat said vessel and said slag and to raise the temperature and pressure in said pressure vessel and to hydrate the calcium oxide to calcium hydroxide while discharging condensed hot water to prevent lowering the temperature of the surface of the slag grains;

(10) keeping the interior of said vessel in a condition of saturated steam at a pressure of about 2 to 10 kg/cm$^2$G for about 1 to 5 hours;

(11) discharging the steam from said pressure vessel to reduce the pressure to atmospheric pressure; and,

(12) discharging said steel-making slag.

5. A method of aging steel-making slag using at least two pressure vessels, pressure vessel 1 and pressure vessel 2, comprising the steps of:

(1) charging steel-making slag at a temperature of less than about 200° C. and crushed to the extent that slag having a grain diameter of 25 mm or less constitutes at least 80% of the total amount, into pressure vessel 1;

(2) sealing said pressure vessel 1 and supplying pressurized steam into said vessel 1 to heat said vessel 1 and said slag to raise the temperature and pressure in said pressure vessel 1 while discharging condensed hot water to prevent lowering the temperature of the surface of the slag grains;

(3) charging steel-making slag at a temperature of less than about 200° C. and crushed to the extent that slag having a grain diameter of 25 mm or less constitutes at least 80% of the total amount, into pressure vessel 2;

(4) keeping the interior of said vessel 1 in a condition of saturated steam at a pressure of about 2 to 10 kg/cm$^2$G for about 1 to 5 hours;

(5) discharging the steam in said vessel 1 to reduce the pressure in said pressure vessel 1 to atmospheric pressure by releasing the steam;

(6) discharging said steel-making slag from said pressure vessel 1;

(7) supplying condensed hot water discharged from pressure vessel 1 in step (2) into pressure vessel 2 to preheat said vessel 2 and said slag contained in said vessel 2 and then discharging said water;

(8) sealing said pressure vessel 2 and supplying pressurized steam into said vessel 2 to heat said vessel and slag and to raise the temperature and pressure in said pressure vessel 2 while discharging condensed hot water to prevent lowering the temperature of the surface of the slag grains;

(9) keeping the interior of said vessel 2 in a condition of saturated steam at a pressure of about 2 to 10 kg/cm$^2$G for about 1 to 5 hours;

(10) discharging the steam in said vessel 2 to reduce the pressure in said pressure vessel 2 to atmospheric pressure; and

(11) discharging said steel-making slag.

6. A method of aging steel-making slag containing calcium oxide comprising the steps of:

(1) charging steel-making slag containing calcium oxide at a temperature of less than about 200° C. and crushed to the extent that slag having a grain diameter of 25 mm or less constitutes at least 80% of the total amount, into a pressure vessel;

(2) sealing said pressure vessel and supplying pressurized steam into said vessel to heat said vessel and slag and to raise the temperature and pressure in said pressure vessel to hydrate the calcium oxide to calcium hydroxide while discharging condensed hot water containing dissolved calcium hydroxide from an opening in said pressure vessel and to prevent lowering the temperature of the surface of the slag grains;

(3) maintaining the interior of said vessel in a condition of saturated steam at a pressure of about 2 to 10 kg/cm$^2$G for about 1 to 5 hours;

(4) discharging steam from said pressure vessel to reduce the pressure in said pressure vessel to atmospheric pressure; and (5) discharging said steel-making slag; and further comprising adding a small amount of water to the bottom of the pressure vessel after sealing the pressure vessel and after supplying pressurized steam to said pressure vessel to dilute said hot condensed water and reduce the density of the calcium hydroxide dissolved in said hot condensed water and to cool the hot condensed water to increase the solubility of calcium hydroxide and to prevent calcium hydroxide from being deposited near said opening for discharging the condensed hot water while discharging the condensed water.

7. A method of aging steel-making slag using at least two pressure vessels, pressure vessel 1 and pressure vessel 2, comprising the steps of:

(1) charging steel-making slag at a temperature of less than about 200° C. and crushed to the, extent that slag having a grain diameter of 25 mm or less constitutes at least 80% of the total amount into pressure vessel 1;

(2) sealing said pressure vessel 1 and supplying pressurized steam into said vessel 1 to heat said vessel 1 and said slag to raise the temperature and pressure in said pressure vessel 1 while discharging condensed hot water to prevent lowering the temperature of the surface of the slag grains;

(3) charging steel-making slag at a temperature of less than about 200° C. and crushed to the extent that slag having a grain diameter of 20 mm or less constitutes at least 80% of the total amount into pressure vessel 2;

(4) keeping the interior of said vessel 1 in a condition of saturated steam at a pressure of about 2 to 10 kg/cm$^2$G for about 1 to 5 hours;

(5) discharging the steam in said vessel 1 to reduce the pressure in said pressure vessel 1 to atmospheric pressure by releasing the steam;

(6) discharging said steel-making slag from said pressure vessel 1;

(7) sealing said pressure vessel 2 and supplying pressurized steam into said vessel 2, at least part of said pressurized steam being the steam discharged from said vessel 1 in step (5), to heat said vessel 2 and slag and to raise the temperature and pressure in said pressure vessel 2 while discharging condensed hot water to prevent lowering the temperature of the surface of the slag grains;

(8) keeping the interior of said vessel 2 in a condition of saturated steam at a pressure of about 2 to 10 kg/cm$^2$G for about 1 to 5 hours;

(9) discharging the steam in said vessel 2 to reduce the pressure in said pressure vessel 2 to atmospheric pressure; and

(10) discharging said steel-making slag.

8. A method of aging steel-making slag in accordance with claim 4, wherein at least a part of the steam discharged from said pressure vessel in step (4) is supplied as a part of the pressurized steam charged to said pressure vessel in step (9).

9. The method of aging steel-making slag in accordance with claim 5 wherein at least a part of the steam discharged from pressure vessel 1 is supplied as a part of the pressurized steam charged to pressure vessel 2 in step 8.

10. The method of aging steel-making slag in accordance with claim 1, 4, 5, 6 or 7, wherein in the step in which the saturated steam is at a pressure of about 2 to 10 kg/cm$^2$G in the interior of said vessel, the pressure in the interior of said vessel is temporarily reduced.

11. The method of aging steel-making slag in accordance with claim 1, 4, 5 or 6, wherein the saturated steam pressure is between about 5 and 10 kg/cm$^2$G.

12. The method of aging steel-making slag in accordance with claim 2, wherein said air-mixed steam is discharged from the bottom portion of the pressure vessel.

13. The method of aging steel-making slag in accordance with claim 2 or 12, wherein the discharging point of said air-mixed steam is above the level of the hot water line passing through a pipe connected to the bottom portion of the pressure vessel.

14. The method of aging steel-making slag in accordance with claim 2 or 12, wherein the discharging of the air-mixed steam within the pressure vessel is started when the interior pressure becomes 1 kg/cm$^2$G.

15. The method of aging steel-making slag in accordance with claim 14, wherein said discharging of steam mixed with air is continued until the pressure within the pressure vessel becomes more than 50% and less than 95% of the predetermined pressure of the steam to be supplied into the pressure vessel.

16. A method of aging steel-making slag in accordance with claim 2 or 12, wherein the discharging of the air-mixed steam within the pressure vessel is started when the difference between the temperature of the air-mixed steam and the temperature of saturated steam at the pressure in the pressure vessel exceeds 5° C.

17. The method of aging steel-making slag in accordance with claim 16, wherein discharging of the steam is continued until the difference between the temperature of the air-mixed steam and the temperature of saturated steam at the pressure in the pressure vessel is less than 5° C.

18. A method of aging steel-making slag in accordance with claim 2 or 12, wherein at least two pressure vessels, pressure vessel 1 and pressure vessel 2, are connected so as to communicate with one another to be used selectively for aging, and a part of the steam discharged from pressure vessel 1 is supplied to pressure vessel 2 to raise the temperature and pressure in pressure vessel 2 while continuously discharging condensed hot water.

19. An aging method comprising the steps of charging steel-making slag containing calcium oxide and having a temperature of less than about 200° C. and crushed to a predetermined grain size, in a sealable pressure vessel and supplying high-temperature, high-pressure saturated steam to the pressure vessel, and maintaining the interior of the pressure vessel in a pressurized high-temperature steam environment for accelerating hydration of the calcium oxide contained in said steel-making slag to calcium hydroxide in the same environment, wherein an optimum time duration for hydration is obtained by determining the time point of complete hydration from the arithmetic operation on a flow rate curve representing the attenuation of the flow rate of the pressurized high-temperature saturated steam supplied to the pressure vessel and at that time the steam from the pressure vessel is discharged to reduce the pressure in said vessel to atmospheric pressure.

20. An aging method comprising the steps of charging steel-making slag containing calcium oxide and having a temperature of less than about 200° C. and crushed to a predetermined grain size, in a sealable pressure vessel and supplying high-temperature, high-pressure saturated steam to the pressure vessel in a pressurized high-temperature steam environment for accelerating hydration of the calcium oxide contained in said steel-making slag to calcium hydroxide in the same environment, wherein the steam flow rate is assumed to be Q, and the attenuation curve of the steam flow rate Q is given by an equation $Q = \exp(At+B)+C$ (A, B, C: constant), the starting point ($t=t_1$) is the time point when the steam in the pressure vessel reaches an environment of a predetermined pressure and temperature, the steam flow rate undergoing a constant change is sampled for a predetermined length of time from the starting point, the curve is partly determined from the sampled value, the sampled value thus obtaining is substituted into the change-curve formula $Q=\exp(At+B)+C$ to determine the constants A, B and C and estimate the whole curve, and the time point ($t=t_2$) of termination of hydration is determined, and thereby, the optimum time duration is obtained by subtracting $t_1$ from $t_2$.

* * * * *